United States Patent [19]
Morse et al.

[11] Patent Number: 6,106,711
[45] Date of Patent: Aug. 22, 2000

[54] FLUID CONDITIONING SYSTEM AND METHOD

[76] Inventors: Dwain E. Morse, 2655 Montrose Pl., Santa Barbara, Calif. 93105; Joseph B. DeWitt, 660 Tabor La., Santa Barbara, Calif. 93108; Brad Gnegy, 2930 W. Central Ave., Santa Ana, Calif. 92704; Eddie Dean Hendrickson, 9808 Oakdale, Chatsworth, Calif. 91311; Raffael Jovine, 593 El Bosque, Santa Barbara, Calif. 93108; Allen Matlick, 4018-B Modoc Rd., Santa Barbara, Calif. 93110; Thomas G. Matherly, 300 Huntington Pl., Lompoc, Calif. 93436; Wade O. Morse, 5110 Twilight Canyon Rd., Apt. 6, Yorba Linda, Calif. 92687; Jonathan J. Owen, 307 Northgate Dr., #C, Goleta, Calif. 93117

[21] Appl. No.: 09/096,254

[22] Filed: Jun. 11, 1998

Related U.S. Application Data

[60] Provisional application No. 60/052,626, Jul. 15, 1997, and provisional application No. 60/073,971, Feb. 6, 1998.

[51] Int. Cl.$^7$ .................................................. C02F 1/24
[52] U.S. Cl. .................. 210/221.2; 210/202; 210/205; 210/522; 261/122.1; 261/123; 261/124; 261/79.2
[58] Field of Search .............................. 210/221.1, 221.2, 210/205, 206, 522, 521, 202; 209/170; 261/123, 124, 122.1, 79.2

[56] References Cited

U.S. PATENT DOCUMENTS

| | | | |
|---|---|---|---|
| 4,022,696 | 5/1977 | Krofta | 210/520 |
| 4,279,743 | 7/1981 | Miller | 209/211 |
| 4,339,027 | 7/1982 | Lauer | 198/383 |

(List continued on next page.)

FOREIGN PATENT DOCUMENTS

| | | |
|---|---|---|
| 2073637 | 10/1971 | France . |
| 25 25 550 | 12/1976 | Germany . |
| 41 36 935 | 5/1993 | Germany . |
| 2000054 | 6/1977 | United Kingdom . |
| 2035150 | 6/1978 | United Kingdom . |
| 2116457 | 3/1983 | United Kingdom . |
| WO 91/15302 | 10/1991 | WIPO . |
| WO 94/17920 | 8/1994 | WIPO . |
| WO 97/20775 | 6/1997 | WIPO . |

OTHER PUBLICATIONS

"Development of Improved Bubble Disruption and Dispersion Technique by an Applied Electric Field Method", Ogata et al., AlChE Journal (vol. 31, No. 1), Jan., 1995, pp. 62–69.

"Fast Flotation with an Air–Sparged Hydrocyclone", J.D. Miller et al.,International Conference on Recent Advances in Mineral Science and Technology, Mar., 1984, 18 pages.

"Testing of Large–Diameter Air–Sparged Hydrocyclones for Fine Coal Flotation at the Homer City Coal Preparation Plant", Miller et al., 9th International Coal Preparation Exhibition an Conference , May 5–7, 1992, pp. 349–367.

(List continued on next page.)

*Primary Examiner*—Thomas M. Lithgow
*Attorney, Agent, or Firm*—Kelly Bauersfeld Lowry & Kelley, LLP

[57] ABSTRACT

A fluid conditioning system and method is disclosed for coupling to a first solution source comprising a suspension solution and particles suspended in the suspension solution. The fluid conditioning system includes a containment vessel defining a treatment environment and including a wall defining a fluid passage and a having an inlet apparatus. The inlet apparatus is coupled to the solution source for receiving a solution stream and directing the solution stream through the passage helically along the cylindrical wall. The containment vessel includes a sparging apparatus disposed downstream of the inlet apparatus for introducing a gas into the solution stream, and an outlet for discharging the sparged solution stream. The system further includes a flotation tank disposed proximate the containment vessel outlet for receiving the discharged solution stream. The flotation tank is adapted to carry a predetermined volume of a second solution to effect flotation of the particles to the surface of the second solution. The flotation tank further includes a tank outlet for exiting processed effluent from the tank.

24 Claims, 18 Drawing Sheets

U.S. PATENT DOCUMENTS

| | | | |
|---|---|---|---|
| 4,397,741 | 8/1983 | Miller | 209/170 |
| 4,744,890 | 5/1988 | Miller et al. | 209/164 |
| 4,838,434 | 6/1989 | Miller et al. | 209/164 |
| 4,997,549 | 3/1991 | Atwood | 209/164 |
| 5,139,663 | 8/1992 | Maples | 210/221.2 |
| 5,151,177 | 9/1992 | Roshanravan et al. | 210/194 |
| 5,160,610 | 11/1992 | O'Reilly | 210/194 |
| 5,199,684 | 4/1993 | Maples | 251/30.01 |
| 5,224,604 | 7/1993 | Duczmal et al. | 209/12 |
| 5,275,732 | 1/1994 | Wang et al. . | |
| 5,382,358 | 1/1995 | Yeh | 210/194 |
| 5,492,630 | 2/1996 | Roshanraven et al. | 210/703 |
| 5,529,190 | 6/1996 | Calton et al. . | |
| 5,529,701 | 6/1996 | Grisham et al. | 210/787 |
| 5,531,904 | 7/1996 | Grisham et al. | 210/703 |
| 5,538,631 | 7/1996 | Yeh | 201/221.2 |
| 5,662,790 | 9/1997 | Carlton et al. . | |

OTHER PUBLICATIONS

"Bubble Generation in Swirl Flow During Air–Sparged Hydrocyclone Flotation", Lelinski et al., 6 pages.

"Fluid–Flow Phenomena in the Air–Sparged Hydrocyclone", Miller et al., XVth International Mineral Processing Congress, 8 pages.

"Flow Phenomena and Its Impact on Air–Sparged Hydrocyclone Flotation of Quartz", Miller et al., Mineral and Metallurgical Processing, Feb., 1995, pp. 51–63.

"Pulsed Corona for Breaking Up Air Bubbles in Water", van Heesch, et al., IEEE Transactions on Dielectrics and Electrical Insulation, vol. 1, No. 3, Jun., 1994, pp. 426–431.

"Model for Magnetic Field Effects on Radical Pair Recombination in Enzyme Kinetics", Eichwald et al., Biophysical Journal, vol. 71, Aug., 1996, 623–631.

"The Origin or Magnetic Field Dependent Recombination in Alkylcobalamin Radical Pairs", Natarajan et al., Photochemistry and Photobiology, 1996, 64(2), pp. 286–295.

"The Status of Air–Sparged Hydrocyclone Flotation Technology", Miller, 4th Asian Symposium on Mineral Processing, Apr. 8–11, 1991, 16 pages.

"Effect of Gas Nuclai on Hydrophobic Coagulation", Journal of Colloid and Interface Science, 179, 311–314, (1996).

"The Potential for Air–Sparged Hydrocyclone Flotation in the Removal of Oil from Oil–In–Water Emulsions", Lelinski et al., Congress Proceedings vol. 1, 19–22/Oct., 1993, 8 pages.

"Superoxide Anion Radical Induces Lipid Phase Transitions That Mimic Temperature–Induced Phase–Transition Phenomenon of Membrane Lipids", Kumar et al., Biochemical and Biophysical Research Communications, vol. 172, No. 1, 1990, pp. 601–606.

"Effects of Dissolved Gas on Emulsions, Emulsion Polymerization, and Surfactant Aggregation", Karaman et al., J. Phys. Chem., 1996, 100, 15503–15507.

Copy of PCT International Search Report–7 pages.

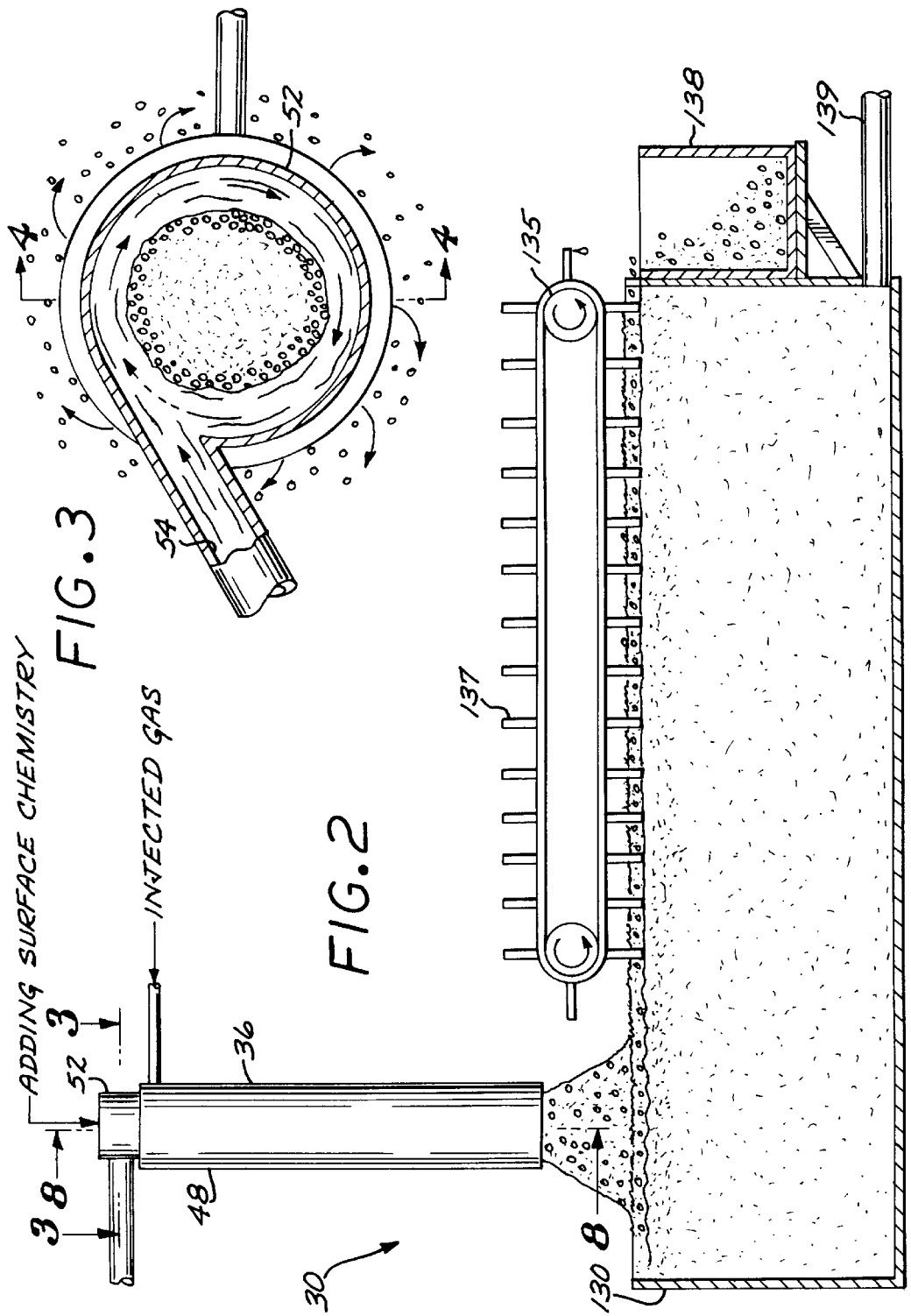

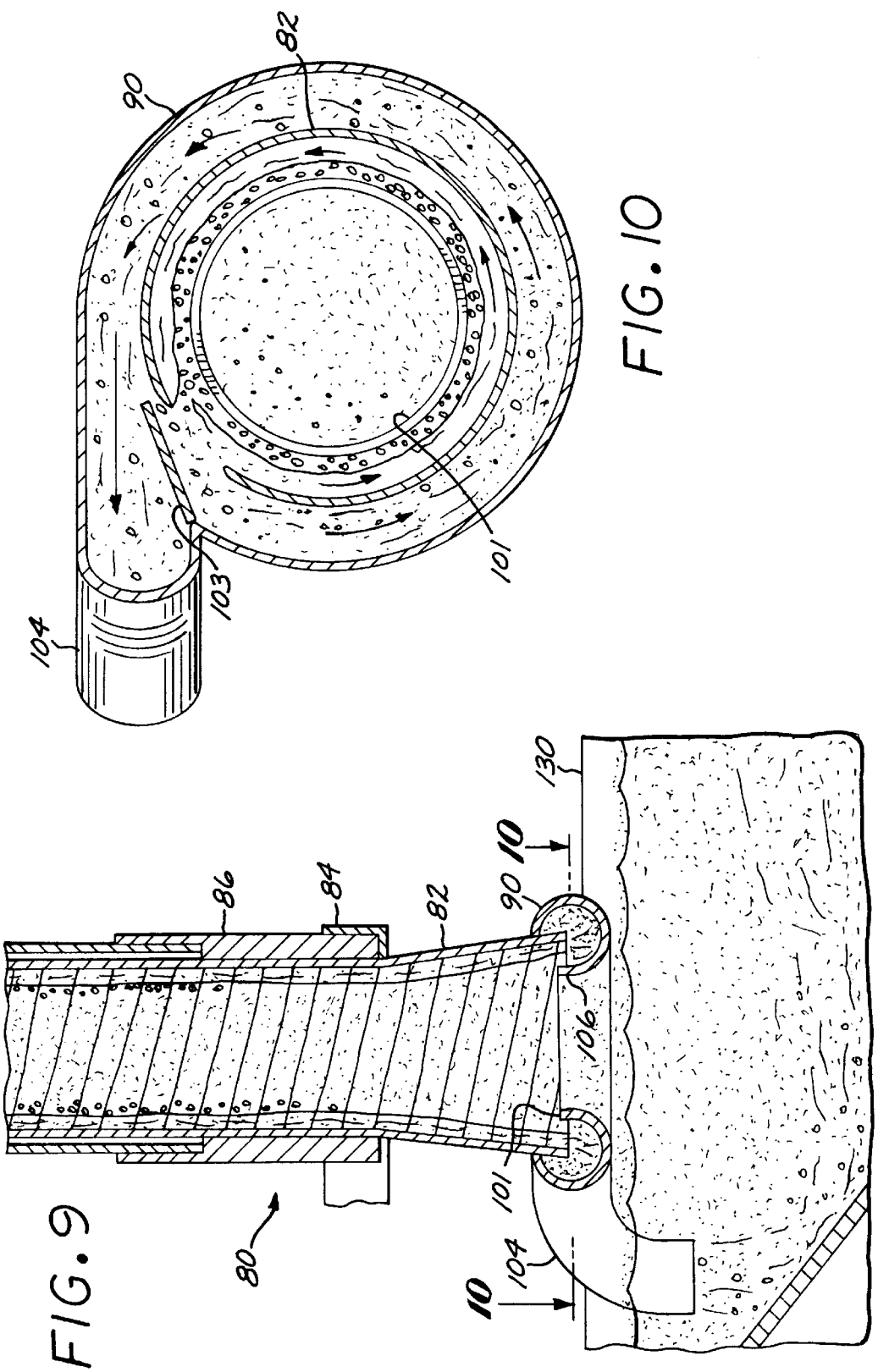

FLUID CONDITIONING SYSTEM AND METHOD

CROSS REFERENCE TO RELATED APPLICATIONS

This application is based on U.S. Provisional Application Ser. No. 60/052,626 filed Jul. 15, 1997 entitled "Apparatus and Method for Separating Hydrophobic Particles from a Solution" and U.S. Provisional Application Ser. No. 60/073,971 filed Feb. 6, 1998 entitled "Flotation Tank Apparatus and Method."

FIELD OF THE INVENTION

The invention relates to fluid conditioning flotation separation components, systems and methods, and more particularly fluid conditioning components, systems and methods that employ a gas for separating particulate matter or gases from carrier fluid streams.

BACKGROUND OF THE INVENTION

Dissolved air flotation (DAF) systems are often used to separate particulate material and gases from solutions such as wastewater. The systems typically employ the general principle that bubbles rising through a solution attach to and carry away particles or gasses suspended or dissolved in the solution. As bubbles reach the surface of the solution, the attached particles coalesce to form a froth or floc that is easily collected while the entrapped gases within the bubble dissipate into the air.

Traditional DAF systems typically introduce small air bubbles into the lower portion of a relatively large tank filled with the solution to be treated. The air bubbles rise through the solution and attach to particles in the solution and gases dissolved in the solution transfer from the solution into the bubbles. The tank includes an outlet that directs purified liquid through the tank as effluent at a flow rate consistent with the inlet rate of the solution.

While traditional DAF systems work well for their intended applications, the processing time and particle/gas removal efficiency typically depends on the residence time of the bubbles in the solution. The residence time, in turn, relates to the bubble buoyancy, the depth of the bubbles within the solution, and the amount of turbulence in the solution. As a result, traditional DAF systems employ relatively large and costly tanks having correspondingly large "footprints". The footprints maximize the gas transfer time from the solution into the bubbles and the probability that particles will contact the bubbles during the residence time available within the tank. Moreover, the relatively large footprints also allow the bubbles sufficient time to float to the surface.

In an effort to reduce somewhat the tank size for a DAF system, one proposal disclosed in U.S. Pat. No. 4,022,696 employs a rotating carriage and floc scoop. The carriage directs an inlet solution substantially horizontally along a flow path to increase the path length for bubble travel, and correspondingly increasing the residence time. Unfortunately, while the tank size reduction is alleged as an advantage, the problem with performance tied to residence time still remains. This appears particularly true with the level of turbulence created by the rotating carriage and scoop.

Another proposal, disclosed in U.S. Pat. No. 5,538,631, seeks to address the turbulence problem by incorporating a plurality of spaced apart and vertically arrayed baffles. The baffles respectfully include respective vanes angularly disposed to re-direct the flow of liquid from an inlet positioned at the bottom of the tank. Liquid flowing through the tank deflects upwardly as it traverses the vanes, allegedly reducing the extensity and intensity of turbulence generated near the inlet to the tank.

While this proposal alleges to reduce the turbulence problem relating to bubble residence time, the redirected fluid still appears to affect bubbles rising in other areas of the tank, and influencing the residence time of such bubbles. Moreover, the proposal fails to address the basic problem of DAF performance being dependent on bubble residence time.

In an effort to overcome the limitations in conventional DAF systems, those skilled in the art have devised air-sparged hydrocyclones (ASH) as a substitute for DAF systems. One form of air sparged hydrocyclone is disclosed by Miller in U.S. Pat. No. 4,279,743. The device typically utilizes a combination of centrifugal force and air sparging to remove particles from a fluid stream. The stream is fed under pressure into a cylindrical chamber having an inlet configured to direct the fluid stream into a generally spiral path along a porous wall. The angular momentum of the fluid generates a radially directed centrifugal force related to the fluid velocity and the radius of the circular path. The porous wall is contained within a gas plenum having gas pressurized to permeate the porous wall and overcome the opposing centrifugal force acting on the fluid.

In operation, the unit receives and discharges the rapidly circulating solution while the air permeates through the porous wall. Air bubbles that emit from the wall are sheared into the fluid stream by the rapidly moving fluid flow. Micro-bubbles formed from the shearing action combine with the particles or gases in the solution and float them toward the center of the cylinder as a froth in a vortex. The centrally located froth vortex is then captured and exited through a vortex finder disposed at the upper end of the cylinder while the remaining solution exits the bottom of the cylinder.

One variation in the general ASH construction, as described in U.S. Pat. Nos. 4,838,434 and 4,997,549, includes employing a froth pedestal at the bottom of the cylinder to assist directing the froth vortex through the vortex finder. Another ASH modification includes replacing the vortex finder and froth pedestal with a fixed splitter disposed at the bottom of the cylinder and having a cylindrical knife edge. The edge is positioned to split the helically flowing solution into components dependent upon the specific gravity of the components.

While the foregoing ASH constructions present significant advantages over conventional DAF systems by generating far more bubble-particle collisions and far more surface area for gas transfer to decrease the solution processing time, the separation capability of an ASH system by itself remains somewhat limited. This is because relatively large amounts of solution typically remain in the froth, and significant particle concentrations often remain in the solution. Additionally, the presence of the froth pedestal tends to compromise the uniformity of the helically flowing solution.

Therefore, the need exists for an economical flotation separation system capable of separating particulate matter and gases from a solution at relatively high throughput rates without the dependence on residence time. Moreover, the need exists for a flotation separation system of greatly reduced size to minimize costs and the space required to treat solutions. An additional need exists for a flotation separation system having a modularized capability for flexibly adapting to a variety of solution treatment environments and applications. The flotation separation system and method satisfies these needs.

SUMMARY OF THE INVENTION

The fluid conditioning system and method of the present invention provides an efficient and cost-effective way of treating solutions by minimizing bubble residence time as a factor in flotation system performance. Further, system performance is greatly enhanced by maximizing particle-bubble contact and gas-bubble transfer. Moreover, by eliminating the effect of residence time from the performance equation, flotation tank dimensions may be significantly reduced to minimize floor space, and material construction costs. Additionally, improved throughput with a substantially reduced footprint is also achieved through the unique combination and construction of modular components.

To realize the advantages above, the invention, in one form, comprises a fluid conditioning system for coupling to a first solution source. The fluid conditioning system includes a containment vessel defining a treatment environment and including a wall defining a fluid passage and a having an inlet apparatus. The inlet apparatus is coupled to the solution source for receiving a solution stream and directing the solution stream through the passage helically along the cylindrical wall. The containment vessel includes a sparging apparatus disposed downstream of the inlet apparatus for introducing a gas into the solution stream, and an outlet for discharging the sparged solution stream. The system further includes a flotation tank disposed proximate to the containment vessel outlet for receiving the discharged solution stream. The flotation tank is adapted to carry a predetermined volume of a second solution to effect flotation of the particles to the surface of the second solution. The flotation tank further includes a tank outlet for exiting processed effluent from the tank.

In another form, the invention comprises an input apparatus for coupling a hydrocyclone to an input solution source. The input apparatus includes an input port for accepting solution to be processed and an input chamber for receiving the solution and supplying the solution into the passage in a helically flowing manner. The input apparatus further includes a ribbon former for forming ribbons of said solution proximate the periphery of the input chamber.

In yet another form, the invention comprises a collector apparatus for use with a hydrocyclone to peripherally collect and discharge a solution flowing helically through the hydrocyclone. The collector apparatus includes a conically shaped tube coupled at its inner end to the containment vessel for permitting the helically flowing solution to outwardly splay within the conically shaped tube. A collection tube is coupled to an outer end of the conically shaped tube to collect the helically flowing solution. The collection tube includes a gap positioned to collect the splayed helically flowing solution and direct the solution to the outlet.

As a further form, the invention comprises a skimmer apparatus for use with a hydrocyclone for directing froth from an inner surface of a solution flowing helically in the hydrocyclone toward a centrally located froth collection apparatus. The skimmer apparatus includes a gas plenum located proximate the containment vessel distal end and a gas input formed on the plenum for providing pressurized gas. The gas plenum includes an open end defining a skimmer outlet port for directing gas from the plenum toward an inner surface of the helically flowing solution.

As yet another form, the invention comprises a flotation tank for separating matter from a solution. The tank includes a flotation chamber and an influent chamber disposed proximate the flotation chamber for receiving a solution stream into the tank and directing the stream along a downwardly sloping fluid path. An isolation unit is disposed between the influent chamber and the flotation chamber and includes a plurality of spaced-apart vanes defining respective flotation cells. The vanes have respective bottom edges disposed proximate the fluid path. The tank further includes an effluent chamber for collecting and exiting the bubble-extracted solution from the tank.

In a further form, the invention comprises a gas sparged hydrocyclone for processing a solution stream from a solution source. The solution comprises a suspension solution and particles suspended in the suspension solution. The hydrocyclone includes a containment vessel defining a treatment environment and including a wall defining a fluid passage and respective proximal and distal ends. An inlet apparatus is disposed at the proximal end of the containment vessel. The inlet apparatus is coupled to the solution source for receiving a solution stream and directing the solution stream through the passage helically along the cylindrical wall. A sparging apparatus is disposed downstream of the inlet for introducing a gas into the solution stream. The hydrocyclone further includes an outlet for discharging the sparged solution stream. The outlet includes a centrally located froth collection apparatus for collecting the bubble froth with a relatively high concentration of particles and a peripherally located solution collection apparatus disposed proximate the containment vessel distal end for collecting and discharging the helically flowing solution having a relatively low concentration of particles. In another form, the invention comprises a method of separating matter from a solution stream received from a solution source in a flotation tank having respective influent and flotation chambers. The method includes the steps of directing the solution stream along a downwardly sloping fluid path; accelerating the solution beneath a plurality of spaced-apart vanes defining respective flotation cells; extracting the solution bubbles from the solution and into the flotation cells; and exiting the bubble-extracted solution as effluent.

In yet another form, the invention comprises a flotation system for separating matter from a solution. The system includes a first solution source for generating a bubble-rich solution stream and a flotation tank. The flotation tank includes a flotation chamber and an influent chamber disposed proximate the flotation chamber. The influent chamber receives a solution stream into the tank and directs the stream along a downwardly sloping fluid path. An isolation unit is disposed between the influent chamber and the flotation chamber and includes a plurality of spaced-apart vanes defining respective flotation cells. The vanes have respective bottom edges disposed proximate the fluid path. An effluent chamber collects and exits the bubble-extracted solution from the tank.

Other features and advantages of the present invention will be apparent from the following detailed description when read in conjunction with the accompanying drawings.

BRIEF DESCRIPTION OF THE DRAWINGS

FIG. 2 is a longitudinal cross-sectional view of the fluid conditioning system in FIG. 1;

FIG. 3 is a lateral cross-sectional view along line 3—3 of FIG. 2;

FIG. 9 is partial axial cross-sectional view of a collector apparatus for optional use with the system of FIG. 2;

FIG. 10 is a horizontal cross-sectional view along lines 10—10 of FIG. 9;

FIG. 14 is a vertical cross-sectional perspective view of the skimmer apparatus of FIG. 13a;

FIG. 15 is an enlarged view of the area encircled by line 15 of FIG. 13a;

DETAILED DESCRIPTION OF THE INVENTION

Contaminated fluids such as water and petroleum based liquids often include a variety of undesirable particles and/or gases. The particles and/or gases typically comprise various forms of Total Suspended Solids (TSS), Chemical Oxygen Demand/Biological Oxygen Demand (COD/BOD), Total Dissolved Solids (TDS), Fats/Oils/Grease (FOG), and Volatile Organic Compounds (VOC). The fluid, when mixed with the particles and/or gases, provides a suspension medium to suspend and distribute the particles and/or gases. Because of environmental concerns regarding the disposal of contaminated water, it is highly desirable to separate the particles and/or gases out of a solution in a safe and cost-effective manner.

Particles and gases suspended in a carrier fluid, such as water, integrate an array of complex dynamic and static forces to effect the characteristics of the fluid. Factors such as physical size, intermolecular effects at solid-liquid-gas interfaces, and mobility through the fluid all effect the behavior of the particles and/or gases. Many of these forces work against one another, creating complex interactions which complicate particle manipulation in the fluid.

First Embodiment of the Present Invention

To harness and manipulate particle and/or gas contaminants subject to the foregoing forces, the present invention is directed to an improved fluid conditioning system that employs a primary gas, for example air or a reactive gas such as ozone, to create a bubble-rich environment for removing particles and/or undesirable secondary gases from a carrier fluid.

Figure 1:
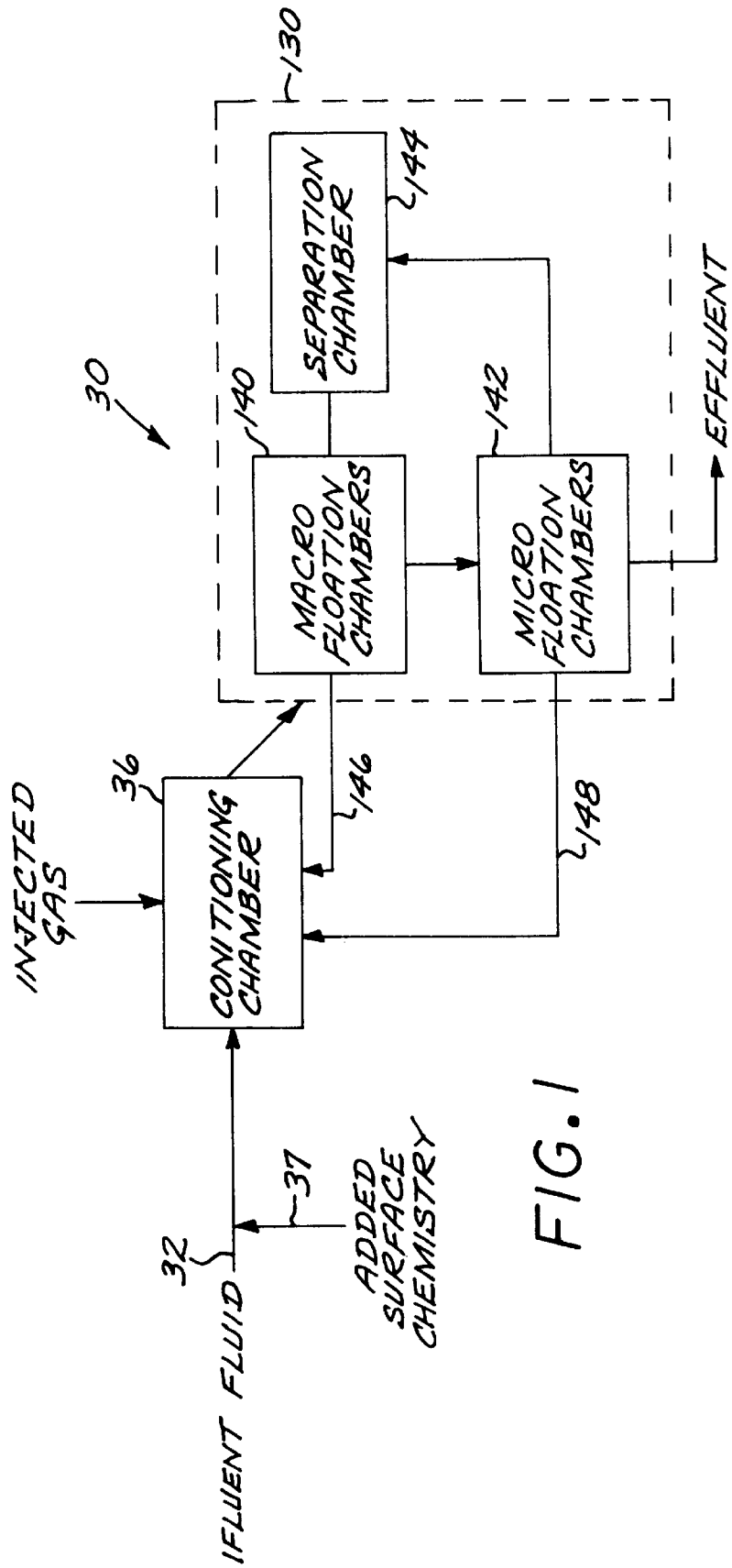
FIG. 1 is a block diagram of a fluid conditioning system according to one embodiment of the present invention.

Referring now to FIGS. 1 and 2, a fluid conditioning system according to a first embodiment of the present invention, generally designated 30, includes a plurality of modularized components to progressively process an influent carrier fluid stream 32 originating from a solution source (not shown). The respective modules include a conditioning chamber 36 disposed downstream of the influent carrier fluid to receive the fluid and create a bubble-rich environment for a high incidence of bubble-particle collisions and gas transfer from the fluid to the bubbles. The input to the conditioning chamber provides for the application of surface chemistry liquids or solids, such as salts and/or polymers, at 37, to promote the coagulation and/or modify the desired zeta potential of targeted contaminants for efficient collection and removal. Positioned proximate the conditioning chamber output is a flotation tank 130. The unique modularized construction above allows efficient particle and gas flotation and separation for a wide spectrum of industries and applications while minimizing the footprint, and consequently the size, of the overall system.

With continued reference to FIG. 1, the input to the conditioning chamber 36 allows for delivery, at 37, of surface chemistry such as liquid or solid coagulant agents and polymer compounds or other forms of applied energy (for example electromagnetic, sonic, ionic, and the like) injected into the fluid to break down and reverse the attraction of the particle to the water and increase particle to particle attractions or hydrophobic interfaces. One form of energy is disclosed in co-pending U.S. patent application Ser. No. 08/979,405 filed Nov. 26, 1997 and entitled "Multi-Modal Method and Apparatus For Treating a Solution", the disclosure of which is expressly incorporated herein by reference. Other potential inputs include in-line mixers or static oil interceptors, floc tubes, or chemical injection means. The general objective of the added surface chemistry is to change the natural particle attractivity with the fluid to a repulsion to the fluid and attractive to air bubbles. It is highly desirable to have the particles in the proper state for satisfactory performance of the present invention. The particles may then be extracted from the fluid by introducing large quantities of air, or bubbles, to which the particles have a greater likelihood of attachment.

Referring now to FIGS. 1–7, gas bubbles such as air, ozone, or chlorine are injected into the fluid by the conditioning chamber 36 that preferably comprises an air-sparged hydrocyclone (ASH). The ASH creates a predetermined spectrum of bubble sizes from less than one micron to several hundred microns in very large quantities. The air-to-water ratio created in the chamber ranges from approximately 2:1 to 50:1, with relative velocities of particles and bubbles of approximately one meter per second. These high ratios and velocities ensure that bubbles and particles collide instantaneously to form an association. This is especially important for small colloidal particles. The relatively large ratio of gas/water and small bubble size creates orders of magnitude more surface area for gas transfer from the solution into the bubbles than in DAF or other sparged systems.

Figure 8:
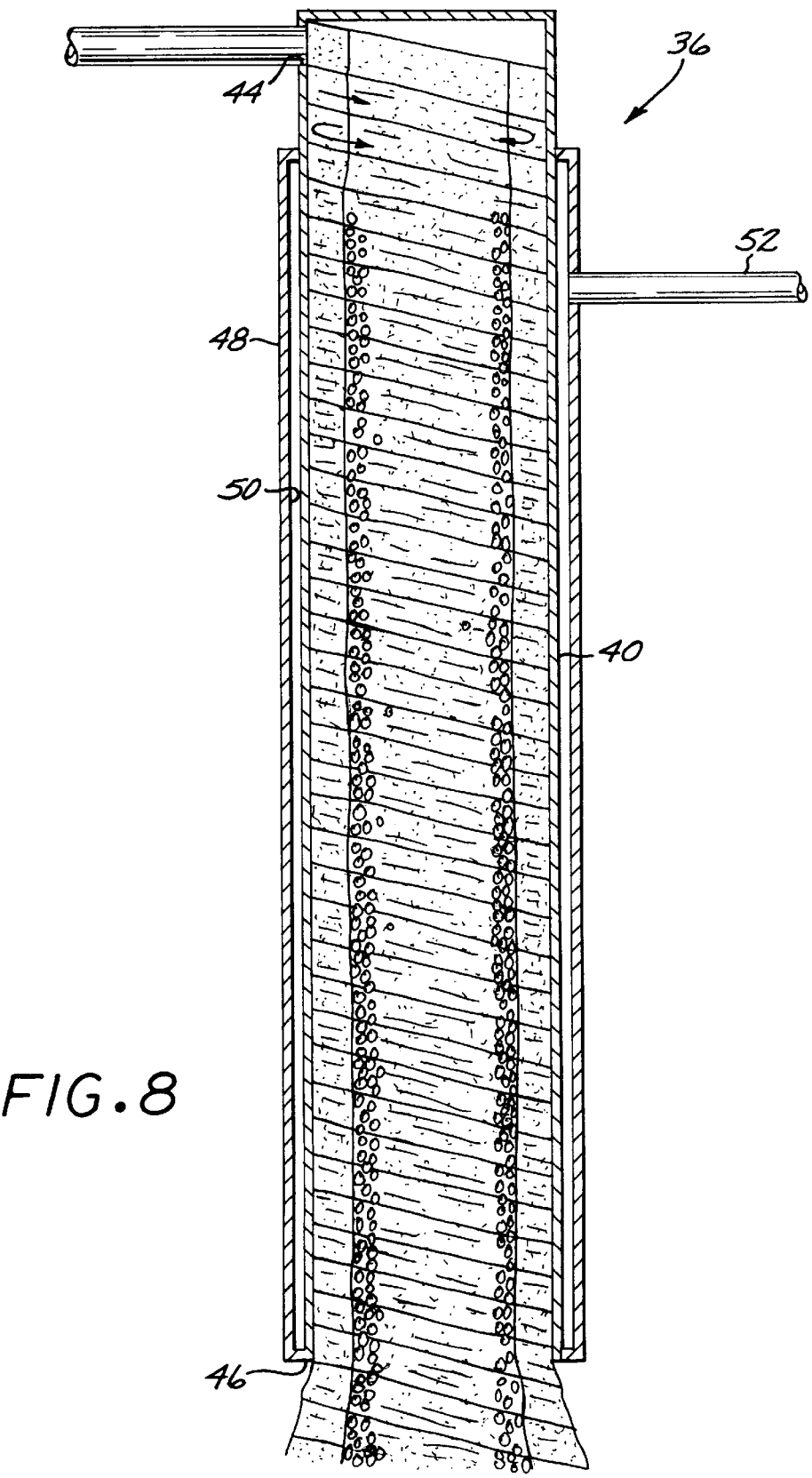
FIG. 8 is an axial cross-sectional view along line 8—8 of FIG. 2.
Figure 11:
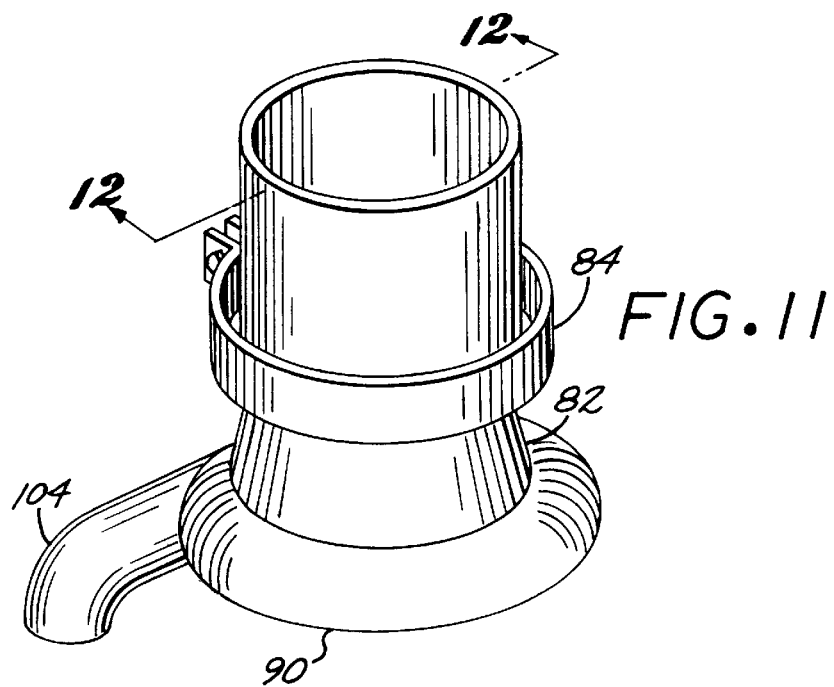
FIG. 11 is a perspective view of the collector apparatus of FIG. 9.
Figure 12:
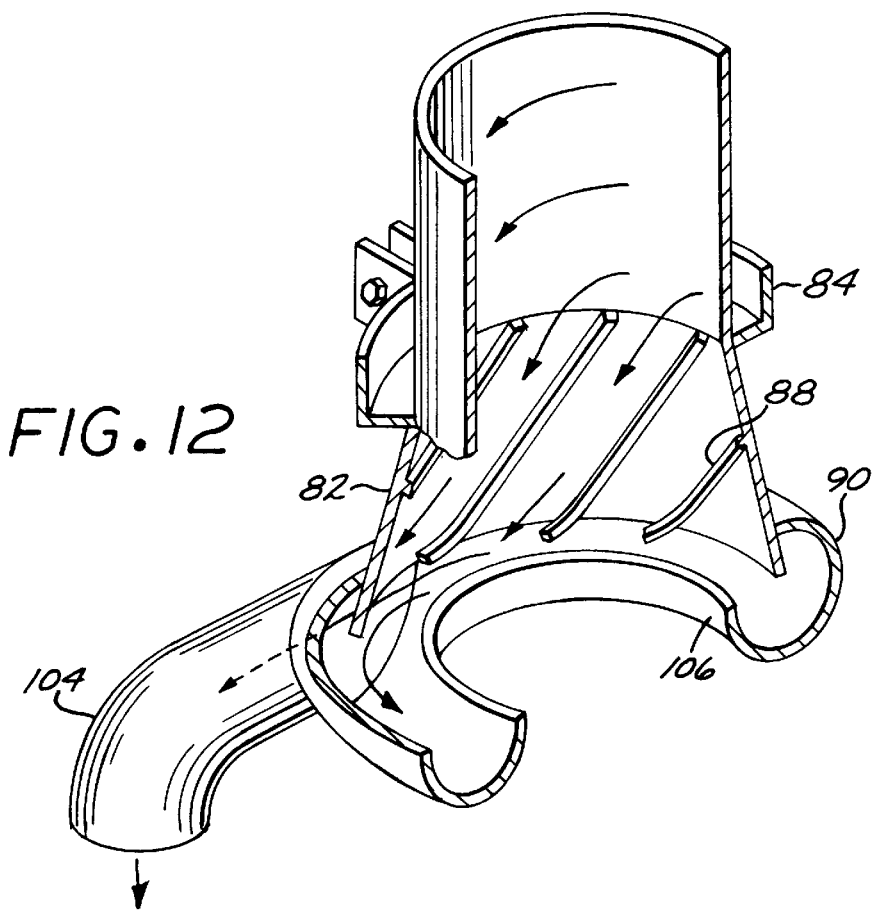
FIG. 12 is a partial vertical cross-sectional view along lines 12—12 of FIG. 11.

Referring more particularly to FIGS. 2–4 and 8, the hydrocyclone 36 includes a cylindrical containment vessel having an open ended porous tube 40 (FIGS. 4 and 8) formed of a gas permeable material. The tube includes an interior wall 42 defining an inner fluid passage with respective inlet and outlet openings 44 and 46 (FIG. 8). An enlarged cylindrical hollow housing 48 is disposed concentrically around the first tube to form an annular chamber 50. The chamber includes a gas inlet 52 (FIG. 8) coupled to a source of regulated pressurized gas such as air or ozone. As an example, the porous tube may be of a porosity having pore sizes within the range of about 20 to 40 microns. The shearing action of the high velocity water passing by the pores creates bubbles ranging from sub-micron to several hundred microns in size.

Figure 5:
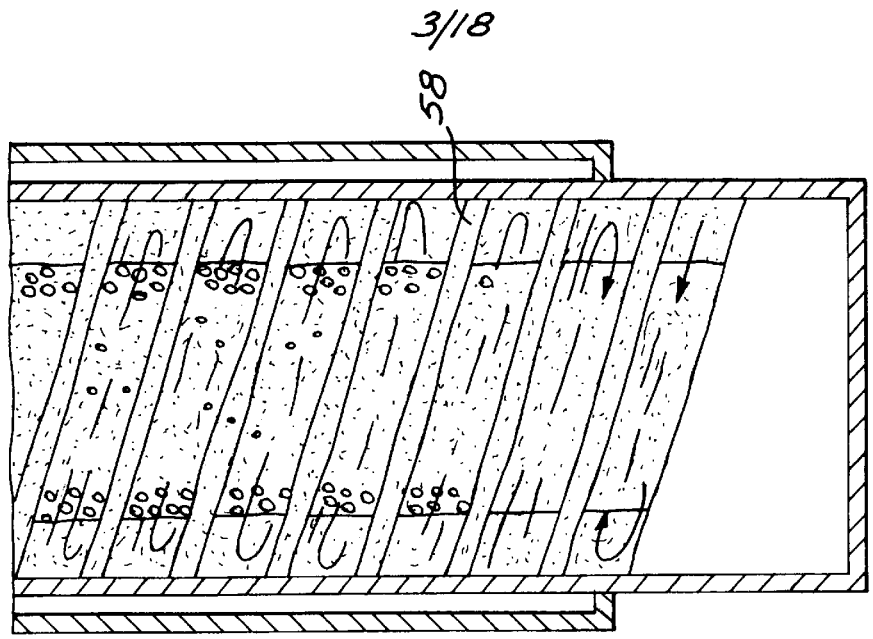
FIG. 5 is an axial cross-sectional view similar to FIG. 4 and illustrating an undesirable ribbon pattern with intermediate gaps.
Figure 4:
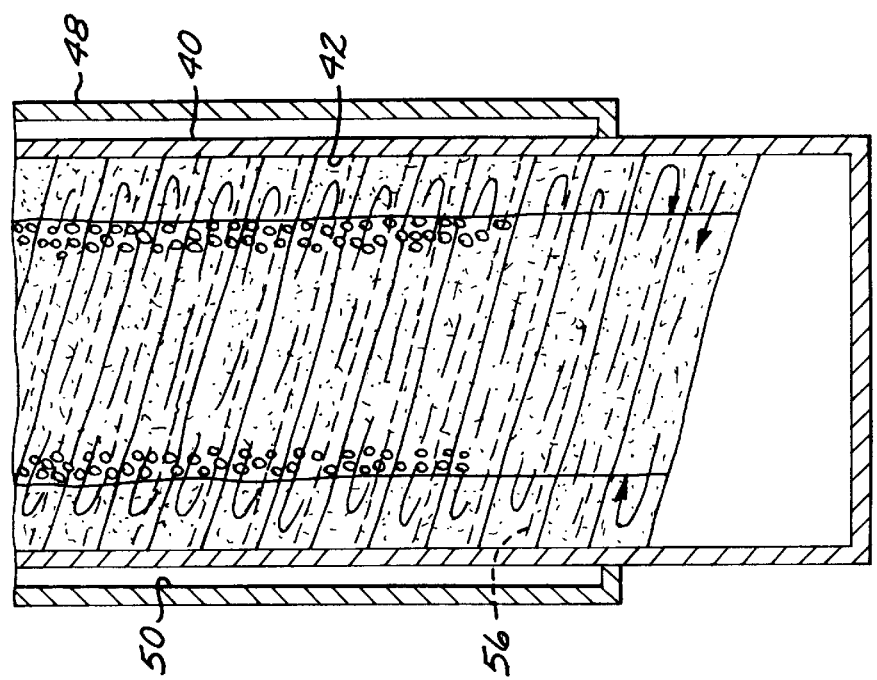
FIG. 4 is an axial cross-sectional view along line 4—4 of FIG. 3 and illustrates an undesirable overlapping ribbon pattern for the helically flowing solution.

Referring more particularly to FIGS. 2 through 5, the hydrocyclone 36 further includes a solution input apparatus or accelerator 52 mounted to the proximal end of the housing 48. The input apparatus may take many forms and acts to manipulate and tangentially direct the flow of input fluid into a helical ribbon-like stream through the fluid passage 42 to eventually exit into the flotation tank 130. FIG. 3 illustrates one form of input apparatus comprising a fixed restrictor 54 configured to generate a predetermined sized ribbon of helically flowing solution. The restrictor preferably generates an essentially continuous ribbon of solution that swirls around the inner wall of the ASH. To avoid turbulence that can disrupt the attachment of the particles to the gas-induced bubbles, it is desirable to avoid ribbon overlaps 56 (FIG. 4, in phantom) or ribbon gaps 58 (FIG. 5).

Figure 6:
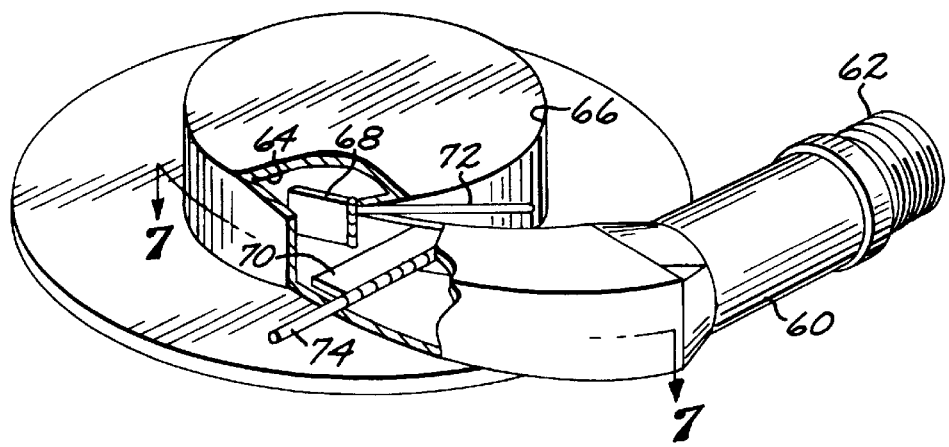
FIG. 6 is a perspective view of a solution input apparatus for use in the system of FIG. 2.
Figure 7:
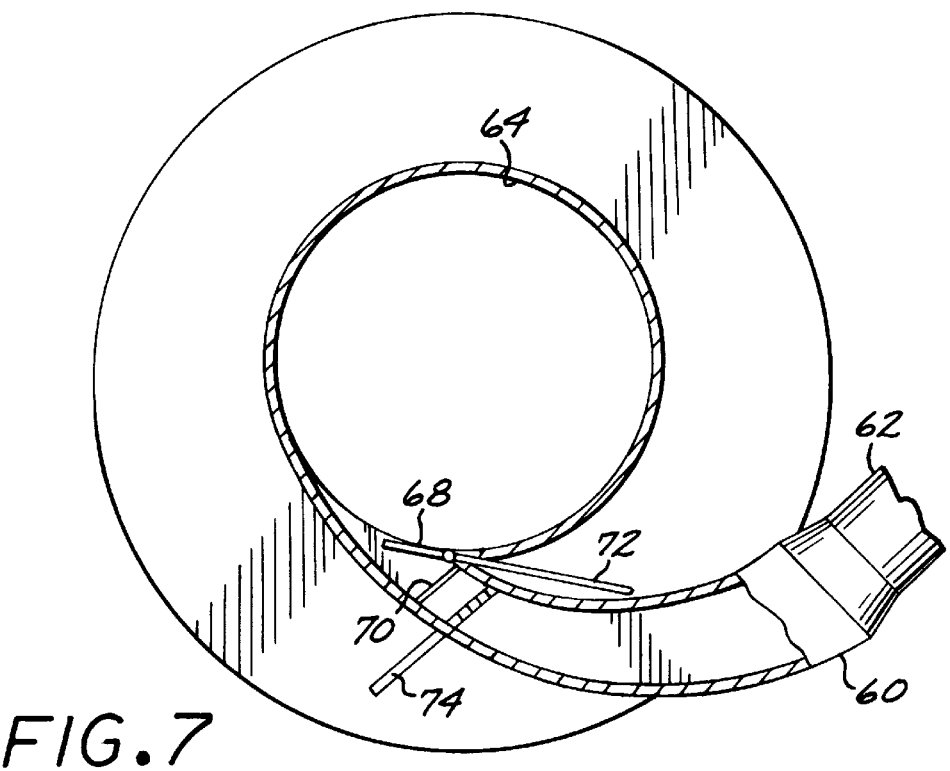
FIG. 7 is a lateral cross-sectional view along line 7—7 of FIG. 6.

Referring now to FIGS. 6 and 7, another form of input apparatus 60 for the hydrocyclone 36 allows control over the size and direction of the solution ribbon, or stream. The input apparatus includes an input port 62 disposed upstream of an input chamber 64. The input port and chamber cooperate to form a ribbon control apparatus for directing solution along a progressively reducing radius of curvature. This in effect radially accelerates the solution to create a substantial centrifugal force acting on the solution within the containment vessel 38. The ribbon control apparatus also serves to allow lowering of the input pump pressure while improving flow resistance. An angled cover 66 sits atop the containment vessel to assist in initially directing the solution downwardly toward the distal end of the hydrocyclone. Respective restrictors 68 and 70 are positioned at the entrance to the chamber 64 to mechanically control the size of the fluid ribbons produced, the rotational velocity of the ribbons, and the spacing between ribbons. The respective restrictors are coupled to respective control rods 72 and 74 to manually adjust the ribbon output. Consequently, the solution input levels, output levels, effectiveness of treatment, and the like may be monitored and the restrictors adjusted accordingly to maximize system performance. Ribbon control may also be effected by changes to solution inlet pressures and flow rates in coordination with the restrictors.

With reference to FIGS. 9–12, the hydrocyclone 36 preferably includes at its outlet a collector apparatus, generally designated 80, to capture and controllably direct substantially particle-free solution. The collector apparatus includes a conical-shaped splay section 82 coupled axially to the hydrocyclone outlet via a coupling ring 84 and a coupling cylinder 86 that concentrically bind the splay section to the hydrocyclone. The splay section is formed with a plurality of radially spaced-apart splay vectors 88 (FIG. 12) to urge the separated solution into a modified downwardly directed flow. The splay section may also be formed in a straight cylindrical configuration without any loss in performance.

Further referring to FIGS. 9–12, the collector apparatus 80 further includes a doughnut-shaped trough 90 formed with an annular slot 102 and mounted to the distal end of the splay section 82. The slot includes an engagement edge or skimmer 101 positioned axially in-line with the expected laminar separation between particle-rich froth, and relatively particle-free solution to skim the separated particle-free solution splaying radially outwardly and downwardly from the conical section. The trough includes a unidirectional solution stop 103 and an outlet formed into an outwardly projecting and downwardly directed spout 104 to discharge the captured solution as a collected stream. The central portion of the trough defines an exit passage 106 for discharging the particle-rich froth on the surface of the solution filled flotation tank 130.

Figure 13A:
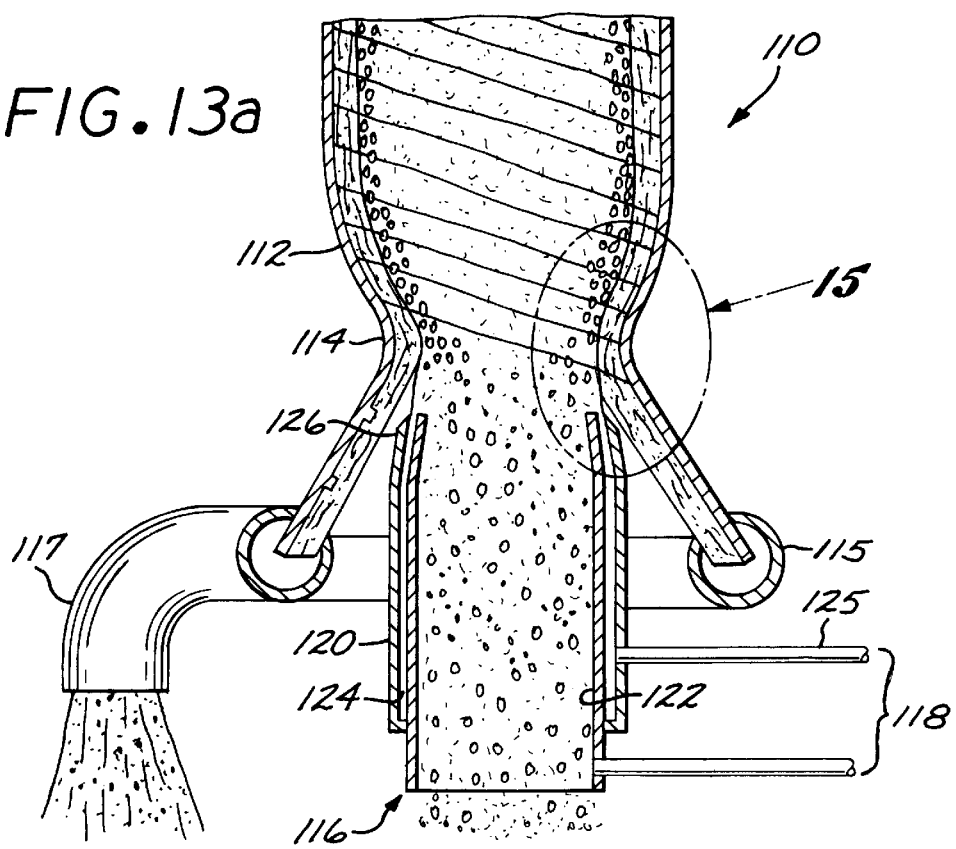
FIGS. 13a–13d are respective vertical cross-sectional views of respective embodiments of a skimmer apparatus for optional use with the collector of FIG. 9 and the system of FIG. 2.
Figure 14:
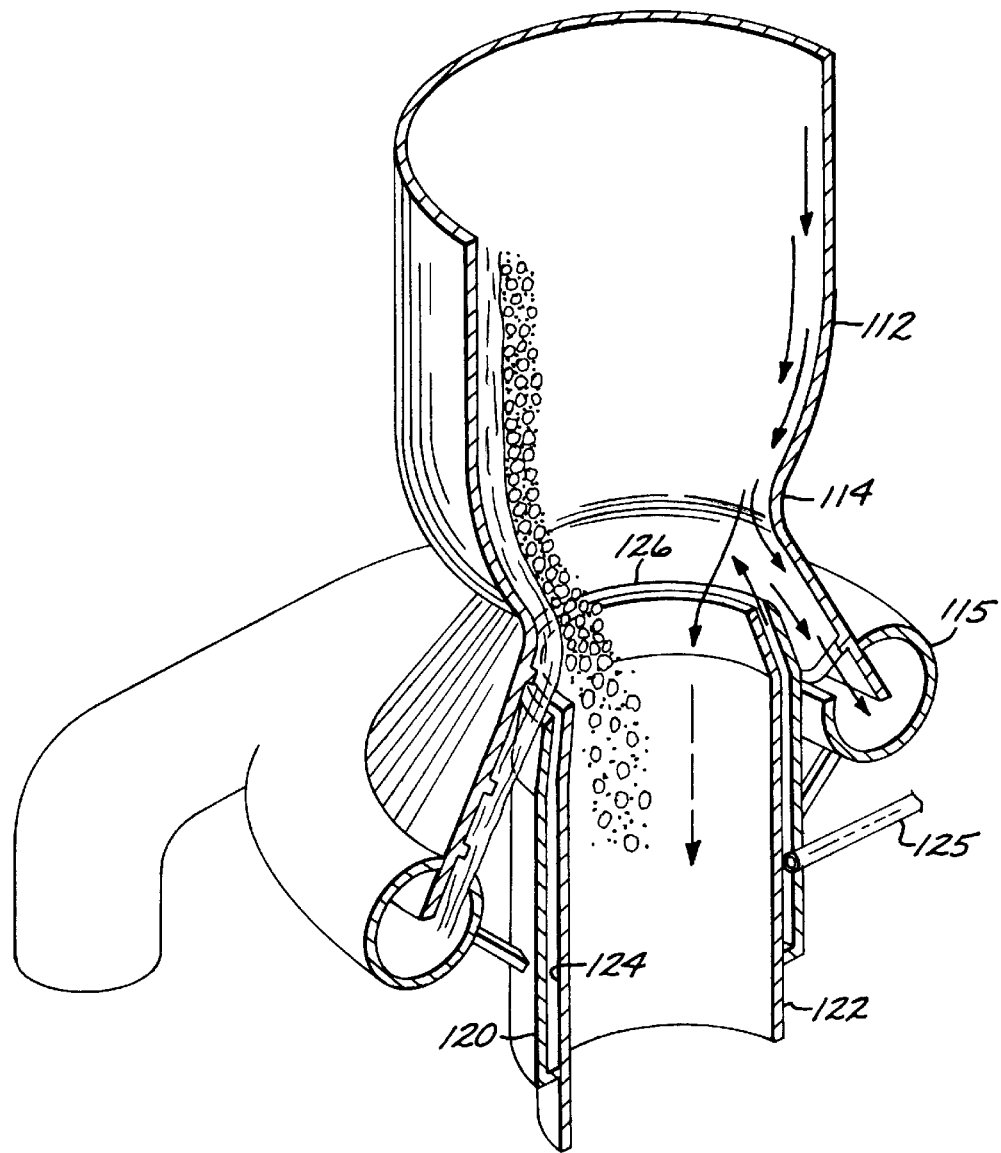
Figure 15:
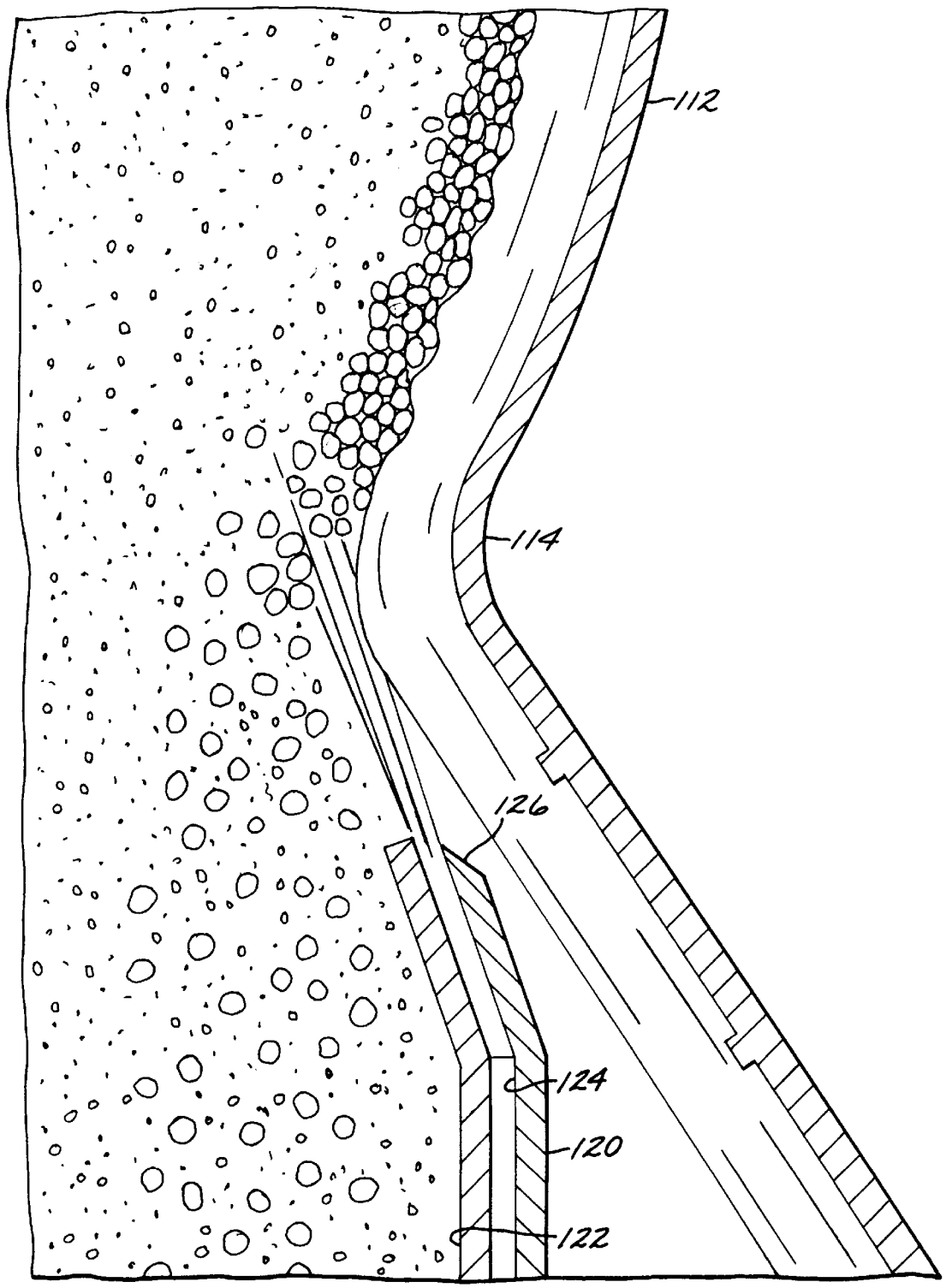

Referring now to FIGS. 13a, 14 and 15, a further embodiment of a collector apparatus, generally designated 110, includes an hourglass-shaped conical splay section 112 with a reduced-in-diameter neck 114 for substantially pinching the outlet solution flow, thereby increasing the velocity of the exiting solution. Disposed at the end of the splay section is a trough 115 having an outlet spout 117 and formed substantially similar to the trough 90 described previously. Optionally, the splay section may be formed into a straight cylindrical configuration.

Positioned slightly downstream of the splay section 112 and projecting axially through the trough 115 is a skimming apparatus 116 carried by a skim support 118. The skimming apparatus comprises a pair of concentric spaced-apart cylindrical tubes 120 and 122 that cooperate to define a gas plenum 124. The plenum is coupled to a gas source 125 and includes an annular open end 126 formed into an inwardly tapered orientation to inject an annular gas stream to a predetermined annular portion proximate the neck 114. The gas stream urges particle-rich froth inwardly to the center of the froth outlet to minimize the amount of froth captured by the trough 115.

Figure 13B:
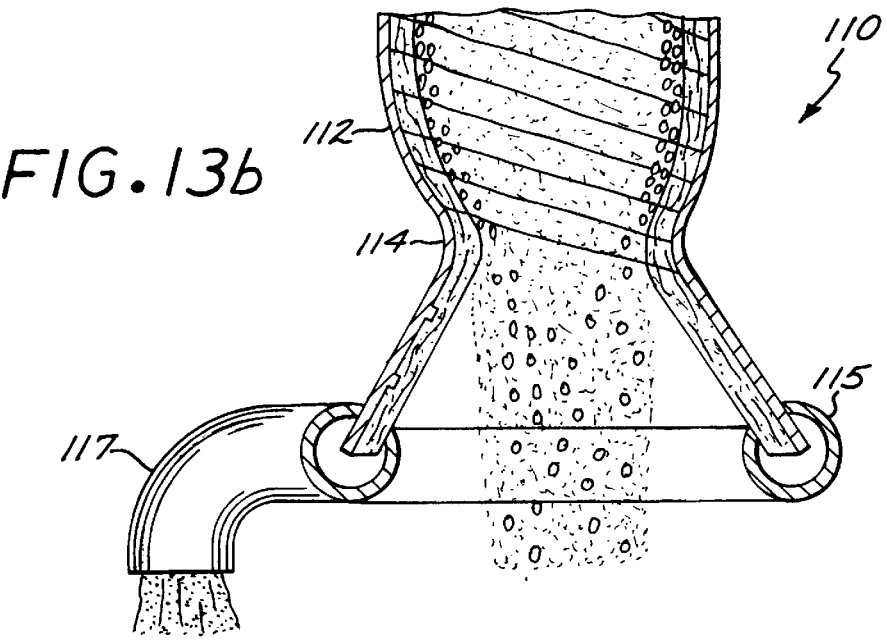
Figure 13C:
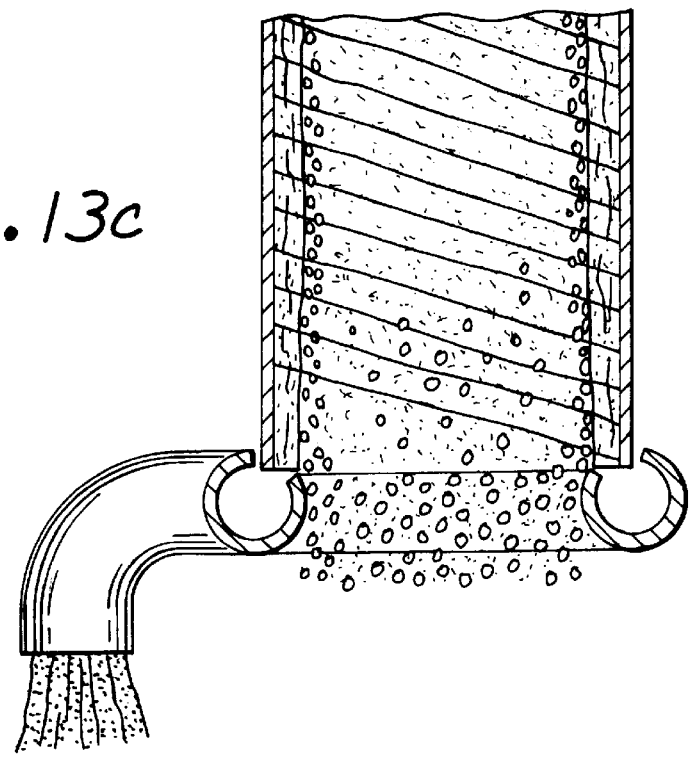
Figure 13D:
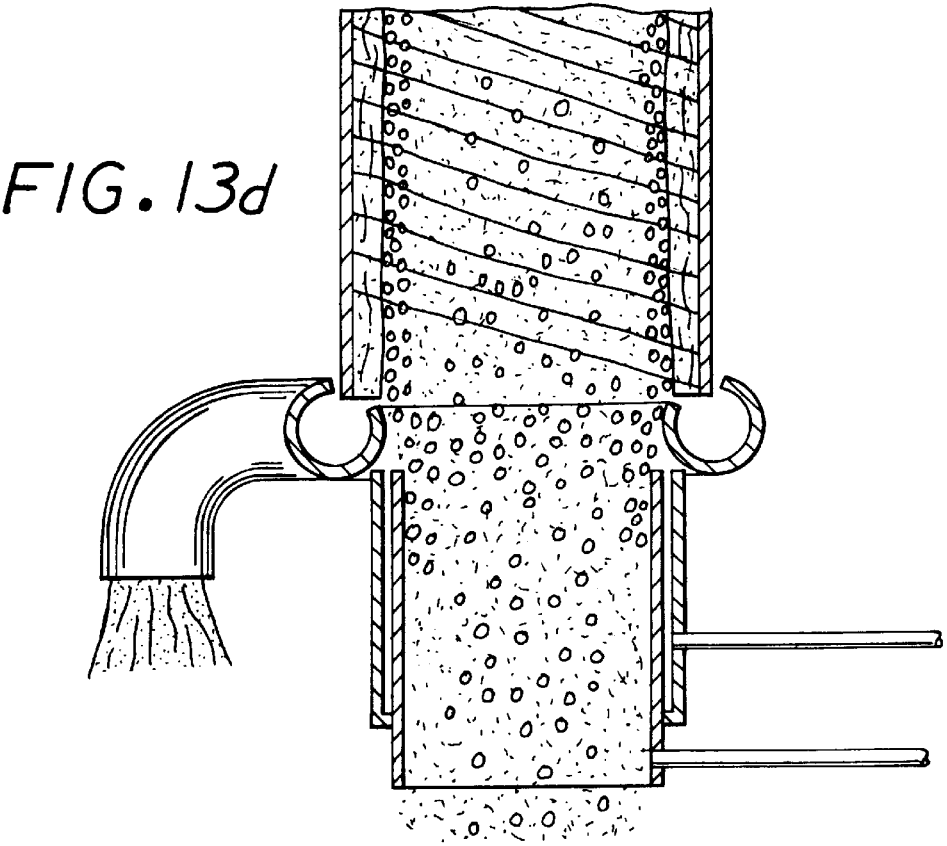

Additional embodiments of a collector apparatus according to the present invention are illustrated in FIGS. 13b through 13d and include, respectively, a construction having an hourglass-shaped splay section 123 (FIG. 13b) without a skimming apparatus; a substantially straight splay section (FIG. 13c) without a skimming apparatus; and a substantially straight splay section 125 (FIG. 13d) incorporating a skimming apparatus 127.

We have discovered several optional uses for the skimming apparatus 116 to purposely harvest a predetermined volume of micro-bubbles from the froth for collection with the relatively particle-free solution. An additional application is to harvest gases entrapped in the core and in the froth on the ribbon surface, thereby allowing a convenient way to recycle gases entrapped within the bubbles, such as VOC's and the like.

With reference back to FIGS. 1 and 2, the flotation tank 130 is positioned downstream of the hydrocyclone 36 and is substantially filled with a relatively clean solution such as clarified water. The flotation tank, as envisioned in one embodiment, may take the form of a modified dissolved air flotation (DAF) tank (FIG. 2), with an open top to receive the separated solution and the froth from the hydrocyclone. A froth skimmer 135 having a plurality of paddles 137 is positioned at the surface of the tank to push deposited froth or floc from the surface of the solution to a receptacle area 138. To exit treated solution from the tank, an effluent outlet 140 is formed near the bottom portion of the tank.

A further embodiment of the flotation tank employs a multi-chambered construction having a plurality of macro-flotation chambers 140 to effect flotation of relatively large bubbles. The respective macro-flotation chambers are coupled to a corresponding number of micro-flotation chambers 142 that carry out flotation of relatively small bubbles. One or more separation chambers 144 collects the froth resulting from flotation from the macro and micro chambers. The tank allows for recirculation of fluid from the respective macro and micro-chambers to the conditioning chamber 36, through respective recirculation connections at 146 and 148. This construction is more fully described below in conjunction with further embodiments of the present invention.

In operation, the flotation separation system 30 is preferably positioned downstream from a solution source (not shown) that generates an untreated carrier fluid containing one or more varieties of particles or gases. The carrier fluid is optionally pre-treated by adding surface chemistry, at 37, to urge the particles to coalesce, and then pumping the fluid to the hydrocyclone 36 by a pump (not shown).

The hydrocyclone input apparatus 52 receives the carrier fluid stream and restricts the stream to a narrow ribbon, consequently accelerating the resulting ribbon flow along the inner passage 42 of the containment vessel 38. The ribbon flow is directed tangentially and downwardly to define a helical shape, and creates a substantial centrifugal force acting on the solution. As the solution swirls through the containment vessel, the sparged gas plenum 124 injects gas bubbles into the solution stream. The bubbles collide with particles in the solution and gases dissolved in the water transfer from the higher concentration in the water to the lower concentration in the bubbles. This process forms a froth that floats towards the center of the containment vessel as a result of the centrifugal force acting on the solution. The action of the hydrocyclone on the solution creates a non-turbulent flow between the relatively particle-free solution and the particle-rich froth.

In the event the modified input apparatus 60 is utilized, the size and shape of the ribbon may be controlled through manipulation of the control rods 72 and 74 to actuate the respective restrictors 68 and 70. Additionally, we have discovered that by incorporating the ribbon control apparatus, a more uniform and turbulent-free ribbon through the hydrocyclone results.

As the ribbon exits the distal end of the hydrocyclone 36 the swirling helical action causes the particle-free solution to splay outwardly for receipt in the flotation tank 130. Simultaneously, the particle-rich froth is deposited on the surface of the flotation tank solution for subsequent collection by the froth skimmer 135.

In systems utilizing the optional collector apparatus 110, the outwardly splaying solution is selectively captured by the trough 115 and directed through the spout 117 for delivery into the body of the flotation tank solution. This aids in reducing the level of turbulence at the surface of the tank which has been found to hinder flotation tank performance. The particle-rich froth passes through the center of the trough and deposits along surface of the tank. The performance of the collector apparatus is substantially improved by employing the optional skimming apparatus 116 to inject the annular gas stream at a predetermined point between the solution and froth.

Second Embodiment of the Present Invention

Figure 16:
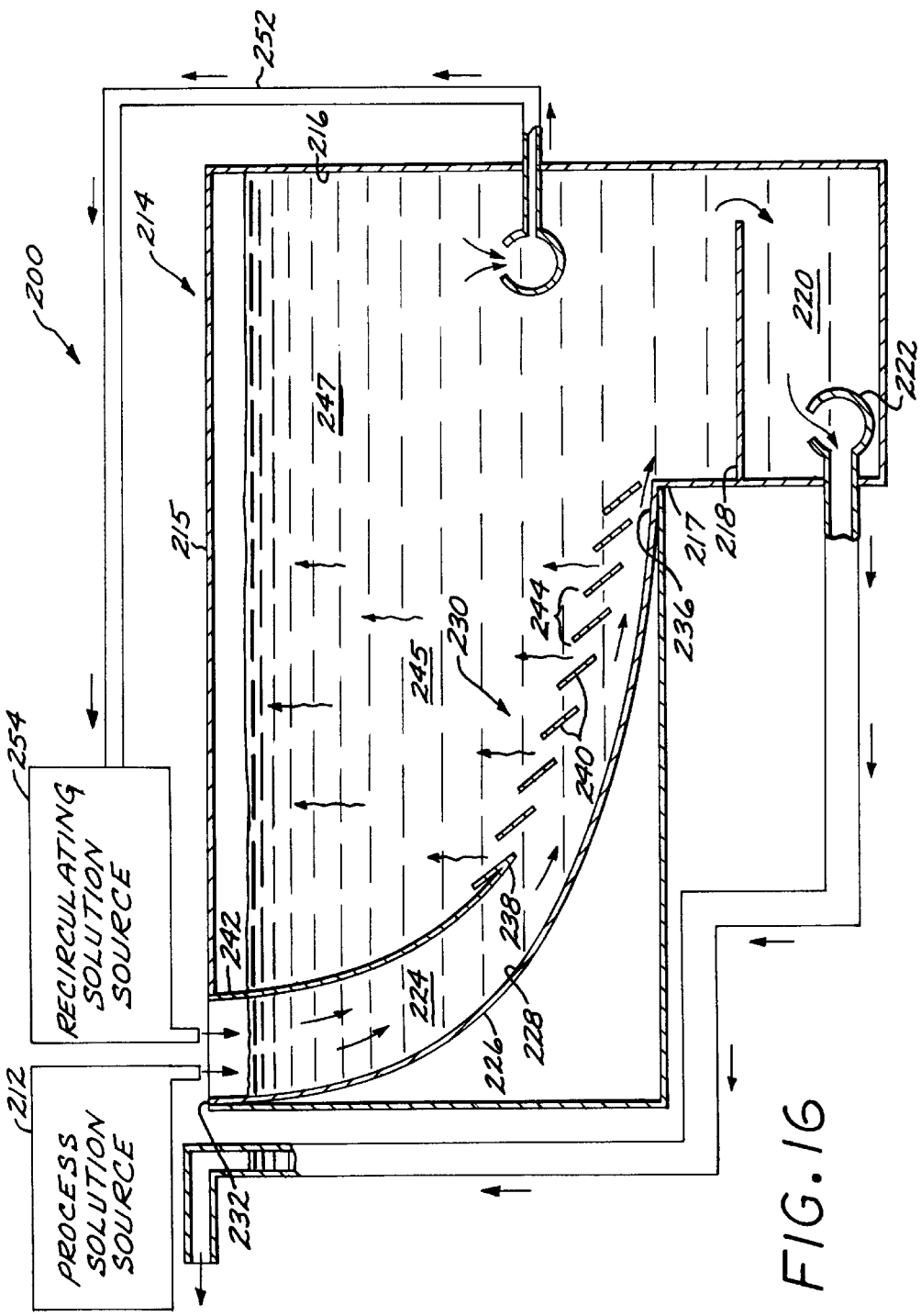
FIG. 16 is a cross-sectional view, in block diagram form, of a fluid conditioning system according to a second embodiment of the present invention.

Referring now to FIG. 16, a fluid conditioning system according to a second embodiment of the present invention, generally designated 200, accomplishes efficient separation of particles from a carrier fluid stream generated by a process solution source 212 through a flotation tank 214. The tank employs an enhanced lift in extracting bubbles from a high velocity directed solution flow into turbulence-free flotation cells. The tank construction employed by the second embodiment expands on the first embodiment by maximizing the availability of turbulence-free zones to allow adequate flotation of bubbles of varying sizes. Because larger bubbles are more buoyant than smaller bubbles (since buoyancy varies with the cube of the bubble radius), minimizing turbulence ensures that far more smaller bubbles are able to coalesce at the solution surface and rise to the surface without being swept out of the tank by the fluid.

Further referring to FIG. 16, the flotation tank 214 incorporates an influent chamber 224 to direct the solution stream along a controlled flow path proximate a flotation chamber 245. An isolation unit 230 is disposed above the flow path and between the respective chambers to draw bubbles from the solution stream into the flotation chamber and enable the stream to exit as effluent.

Referring again to FIG. 16, the flotation tank 214 includes a rectangular-shaped containment wall 215 formed of a rigid watertight solid material. The containment wall defines a relatively large macro flotation area 216 for turbulent-free flotation of relatively large bubbles and drops down at 217 to cooperate with a cantilevered partition 218 to define the inlet to a micro flotation area 220. The micro-flotation area comprises a relatively turbulent-free area for very small bubbles. A weir 222 is disposed in the micro flotation area to exit a predetermined mass flow of purified effluent from the tank.

The influent chamber 224 comprises a baffle 226 having a downwardly sloping surface 228 and the isolation unit 230. The baffle is mounted within the macro flotation area 216 and includes an upper edge 232 to receive the solution stream from the solution source 212 and a lower edge 236 fixed in parallel relationship to the bottom of the tank. The baffle surface 228 is configured to redirect the stream from a substantially vertical flow to a substantially horizontal low turbulence flow at the bottom of the tank.

Figure 17:
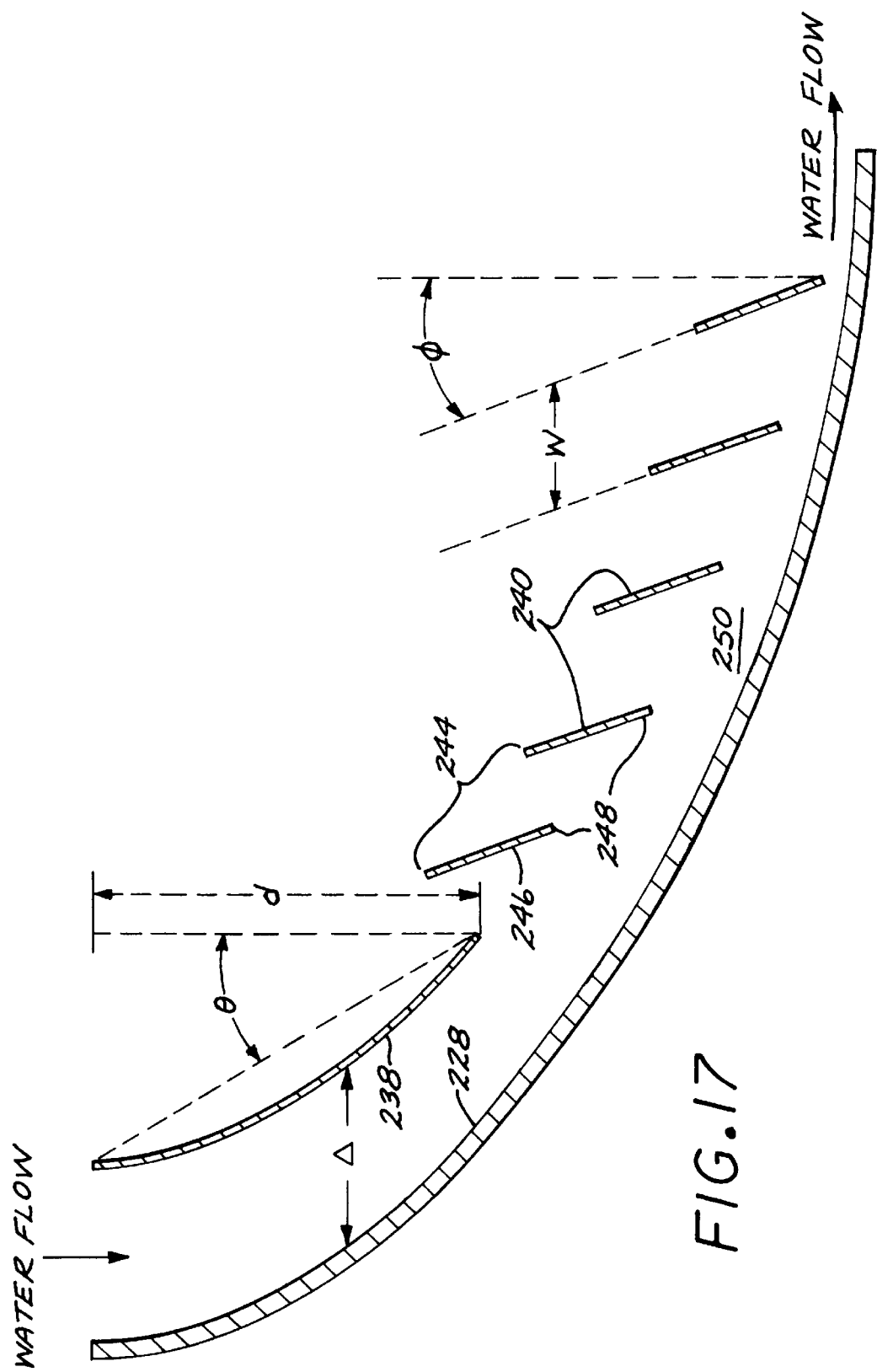
FIG. 17 is a partial longitudinal cross-sectional view of the flotation tank of FIG. 16.
Figure 18:
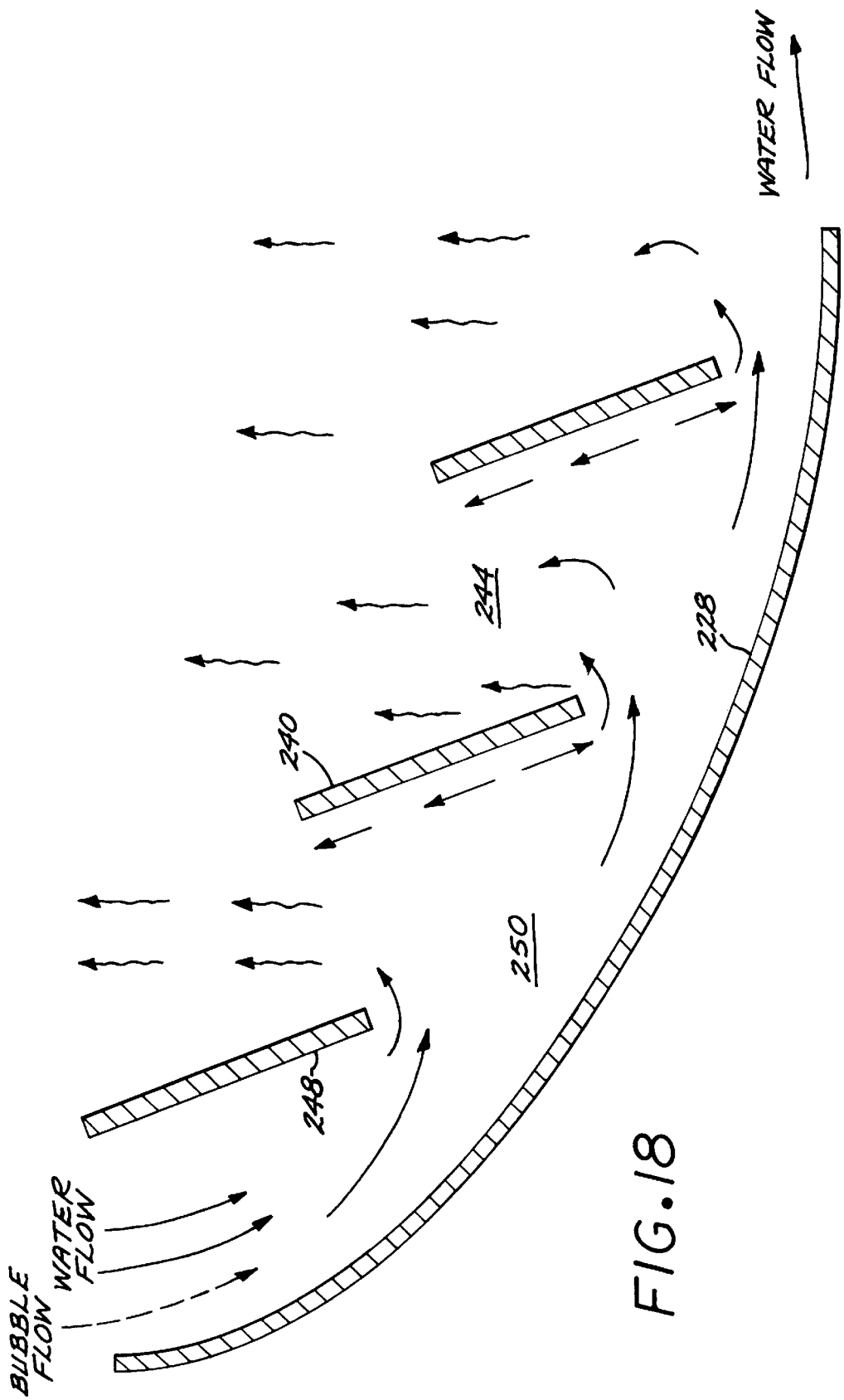
FIG. 18 is a partial cross-sectional view similar to FIG. 17.

With reference to FIGS. 16 and 17, the isolation unit 230 is offset laterally in close proximal relation to the baffle surface 228 and includes a plurality of spaced-apart primary and secondary vanes 238 and 240. The spacing of the vanes depends on whether the fluid stream is to be accelerated or maintained at a constant velocity. The sole primary vane 238 extends upwardly in offset parallel relation to the baffle surface and projects vertically above the surface of the tank at 242 to minimize turbulence in the flotation chamber resulting from the inlet solution stream.

The vanes comprise respective panels that cooperate to form a plurality of flotation cells 244 that open into the flotation chamber 245. As an example, the panels are approximately four inches in length and spaced apart at intervals of approximately four-and-one-half inches. The panels have respective engagement surfaces 246 that are angularly disposed at predetermined orientations to create a pressure differential between the solution stream and the fluid in the cells as the solution stream flows underneath. The engagement surfaces terminate in respective bottom edges 248 that cooperate with the baffle surface 228 to form a progressively narrower laminar flow passage 250. The edges are respectfully chamfered at a preferred angle of approximately 10 degrees with respect to horizontal.

Referring again to FIG. 16, to dynamically control the velocity of the solution stream through the flow passage, the particle flotation separation system 200 includes a recirculation mechanism 252 that includes a pump (not shown) to redirect solution at a specified mass flowrate out of the tank, through a recirculating solution source 254, and back through the tank influent chamber 224. The recirculated fluid does not affect the overall mass flowrate through the system but rather increases internal flow to create a negative pressure difference that allows bubbles to expand and rise to the top of the laminar flow.

The recirculation mechanism also provides a means of increasing the probability of bubble-particle contact and coalescence. Invariably there will be a small percentage of freely suspended particles unattached to bubbles in the flotation tank. The action of the recirculation mechanism captures such particles and redirects them through the influent chamber for further opportunities at attaching to bubbles. Moreover, by employing a conditioning chamber in the path of the recirculating solution, the probability of bubble-particle contact through multiple passes increases through the system substantially.

Referring now to FIG. 17, the isolation unit includes several parameters to complement the recirculation mechanism 252 for controlling and maximizing the effectiveness of the primary vane 238 and the secondary vanes 240. For example, the depth d and angle θ of the respective vanes control the number of large bubbles that escape and produce undesirable disturbance of the calm surface in the flotation chamber 245. The respective vane bottom edges 248 cooperate with the sloped baffle surface 228 to direct the mass flow through the tank as a laminar flow along the sloped surface.

One parameter for controlling the velocity at which the stream flows through the tank includes the offset Δ between the primary vane 238 and the baffle surface 228. The subsequent secondary vanes 240 in the flotation chamber 245 also modify this velocity, but the primary vane controls the acceleration under the flotation cells 244. A large offset typically results in a low acceleration and low linear velocity along the baffle surface. At lower velocities, eddy currents tend to appear along the baffle surface and overcome the positive flotation effects of the flotation chamber. Higher velocities generated by a narrowing of the offset tend to maximize the effects of the flotation chamber. However, too narrow an offset may undesirably constrict the required mass flow under the flotation chamber.

In operation, a solution stream is directed from the process solution source 212 into the influent chamber 224 at an angle of approximately 45 degrees with respect to the horizontal surface of the tank solution. This conveniently maximizes the dispersion of energy in the deposited solution while minimizing turbulence at the tank surface. The stream is guided through the narrowing flow passage 250 where it accelerates past the respective vanes 238 and 240. The acceleration effect is caused by the progressively deeper penetration of the vane lower edges 248 into the flow stream. Forcing the flow through the respective restrictions creates a higher velocity flow, which in turn creates a lower pressure condition in the stream beneath each vane. The lower pressure causes bubbles to expand and enhances the buoyancy of the bubbles and associated bubble-particle composites. Additionally, due to the flow past the chamfered edges, respective eddy currents are developed. The bubbles and particles are drawn out of the stream, from the swirling action of the eddy currents, and rise to the surface above the flotation chambers.

The cleaned effluent exits through the micro flotation area 220 to a weir 222. The extended depth configuration of the effluent chamber creates increased pressure and buoyancy forces on micro bubbles that may remain in the solution. The partition 218 provides an advantageous resistance to losing bubbles and bubble-particle composites through the weir. Further, the increased depth adds length to the path taken by a bubble stream before exiting the weir. These two effects combine to add residence time for the bubbles to float to the surface. However, the most important feature of the extended depth is the significant increase in time that an effluent bubble has before it reaches the weir.

The collected froth is further processed in a separation chamber area 247 to effect de-watering of the froth or floc. This area is preferably disposed proximate the surface of the flotation tank and generally involves draining the collected bubbles comprising the froth with a defoamer or the like.

The fluid conditioning system 200 of the present invention is especially advantageous when utilized in a flotation system employing an air sparged hydrocyclone as the solution source 234. This is because bubble-particle contact and coalescence occur with high probability in the hydrocyclone before the stream even reaches the tank. Employing a hydrocyclone as a solution source also minimizes capital outlays due to the reduced costs associated with the straight-forward design as compared to complex dissolved air injection schemes and the like. Moreover, the anti-turbulent design allows for extremely high hydraulic flow rates while simultaneously maximizing the residence time of bubbles in the tank.

Third Embodiment of the Invention

Figure 19:
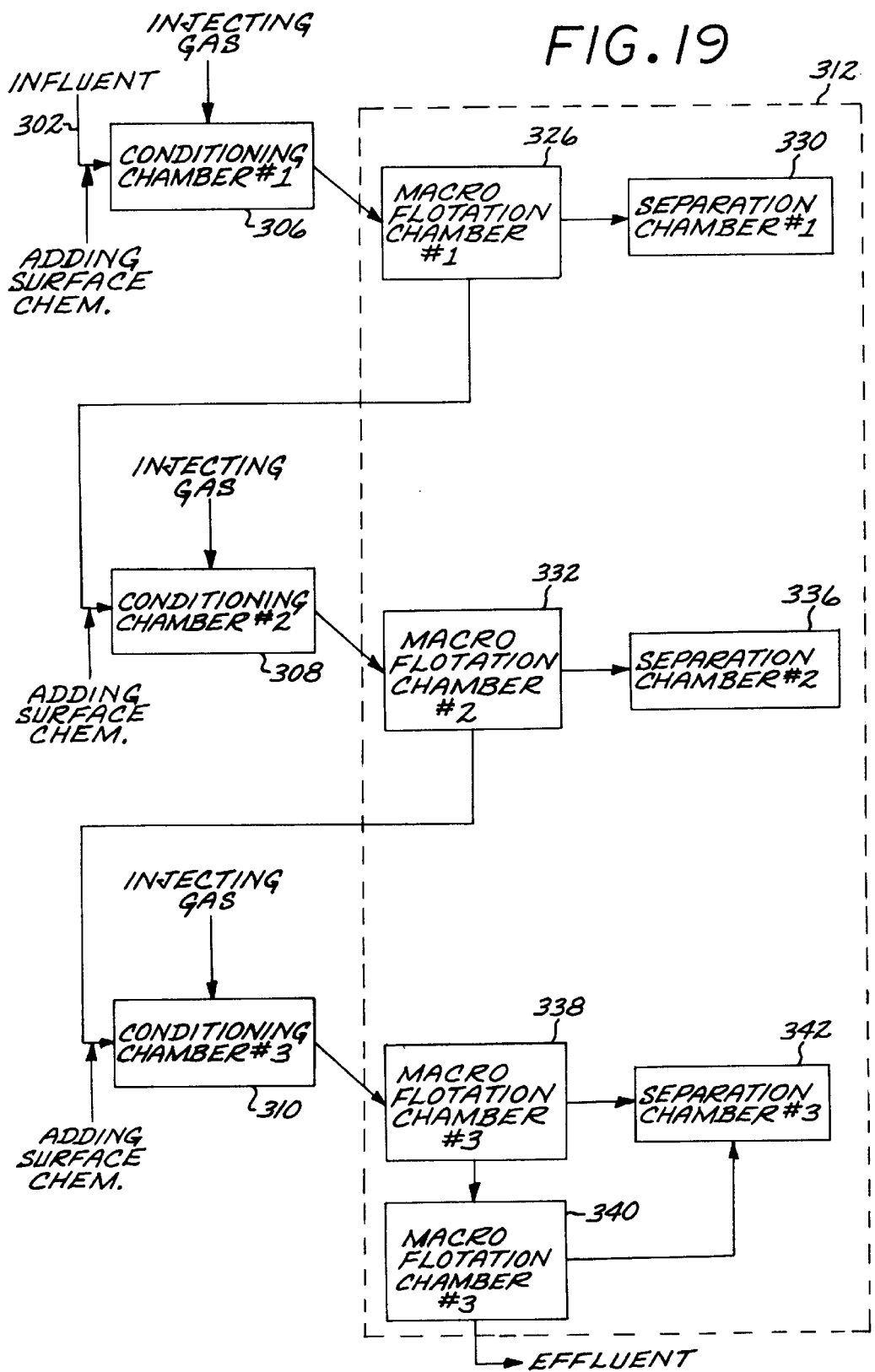
FIG. 19 is a block diagram of a fluid conditioning system according to a third embodiment of the present invention.

Referring now to FIG. 19, a fluid conditioning system according to a third embodiment of the present invention, generally designated 300, includes a plurality of highly modular components to progressively process an influent carrier fluid stream 302 originating from a solution source (not shown). The respective modules include a plurality of conditioning chambers 306, 308 and 310 comprising respective air sparged hydrocyclones as described in the foregoing embodiments. Disposed at the respective inputs of each conditioning chamber are respective ports for the addition of surface chemistry, as previously described in the foregoing embodiments. The hydrocyclones are disposed upstream of a multi-chambered flotation tank 312 that effects efficient multi-stage processing of a solution stream.

Figure 20:
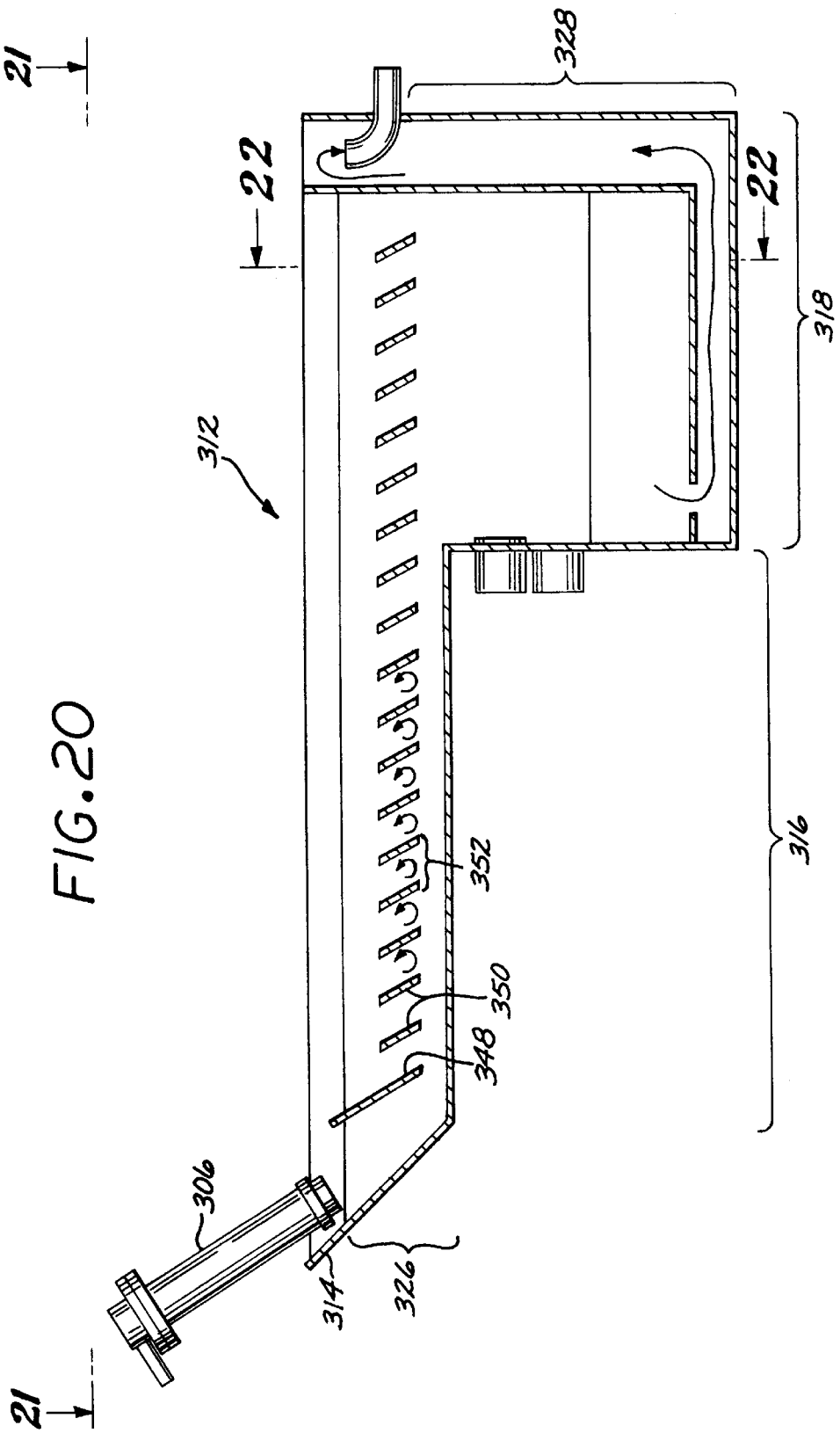
FIG. 20 is a longitudinal cross-sectional view of the system of FIG. 19.
Figure 21:
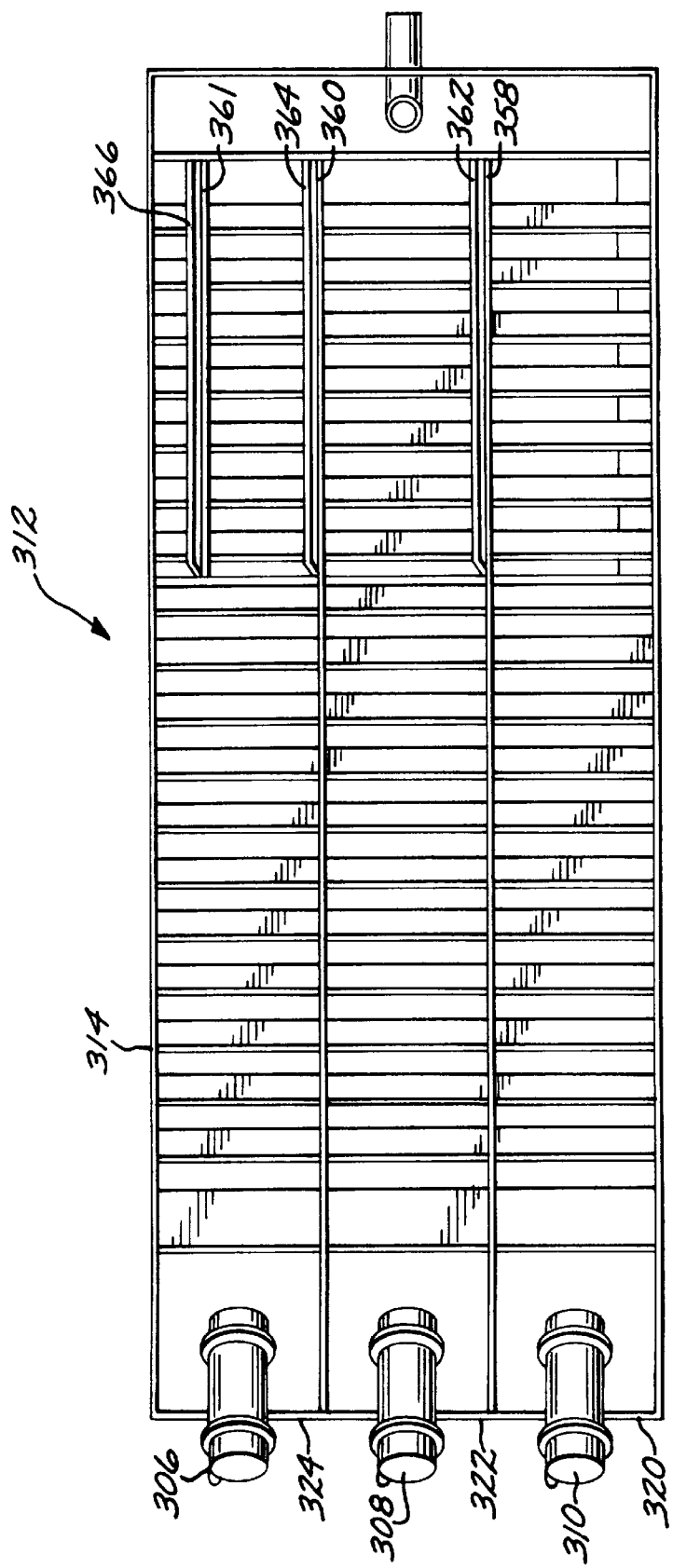
FIG. 21 is a top plan view along line 21—21 of FIG. 20.
Figure 22:
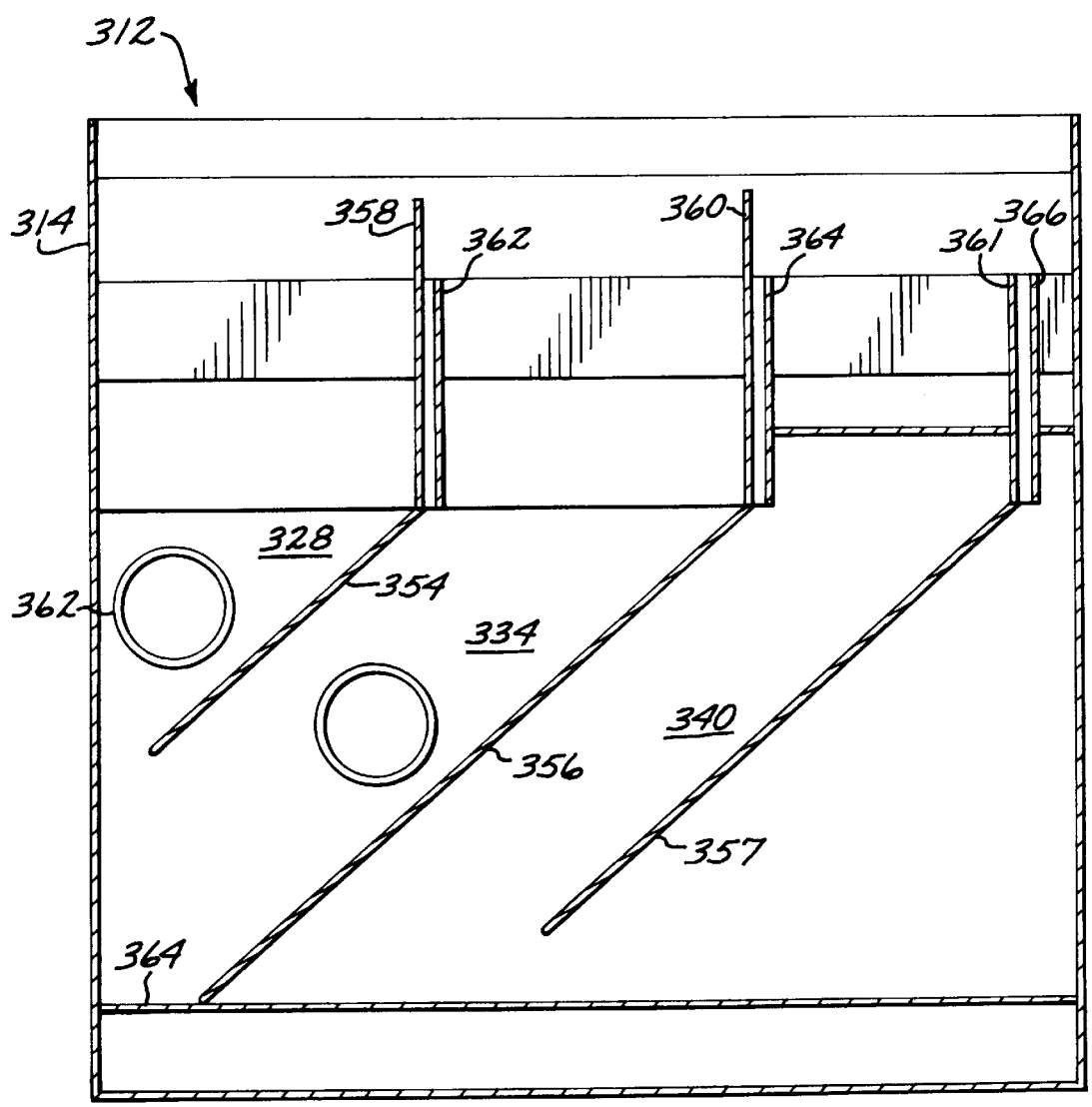
FIG. 22 is an enlarged lateral cross-sectional view along line 22—22 of FIG. 21.

Referring again to FIG. 19, and more particularly to FIGS. 20 through 22, the flotation tank 312 includes a watertight container 318 having a relatively shallow inlet area 316 and a relatively deep outlet area 314. The tank is divided into three laterally spaced apart longitudinal channels 320, 322 and 324 which act as three separate treatment passes for the solution. Each channel or pass employs respective macro-flotation, micro-flotation and separation chambers (FIG. 19, 326, 328, and 330 for pass 1; 332, 334, and 336 for pass 2; and 338, 340, and 342 for pass 3).

Referring now to FIG. 22, each macro flotation chamber 326 (for pass 1) is disposed in the shallow area 316 of the tank 312 and each comprise a construction similar to that described for the second embodiment of the invention to take advantage of the unique macro chamber construction. To achieve a lifting effect on the bubbles, each macro chamber includes an inlet baffle 346 that cooperates with a primary vane 348 to create a high velocity flow of solution at the bottom of the tank. A plurality of spaced apart secondary vanes 350 are disposed behind the primary vane and just above the laminar flow path to define respective flotation cells 352 and to create swirling eddy currents within each flotation cell to extract relatively large bubbles from the solution stream and into the flotation cells.

With particular reference to FIGS. 21 and 22, each micro chamber 328 (for channel 1) is positioned in the relatively deep area 318 of the tank to realize a much larger cross-sectional area, and consequently dramatically reduce the velocity of the solution stream. The respective second and third micro chambers 334 and 340 each include respective micro bubble crawlers 354, 356 and 357 that project downwardly and angularly from respective channel walls 358, 360 and 361 in a parallel relationship. The tops of the respective crawlers terminate in respective turbulence-free isolation zones defined by secondary walls 362, 364, and 366 set-off in spaced apart parallel relationship from the respective channel walls 358, 360 and 361. The crawlers inhibit the upward mobility of micro bubbles in the solution by causing the bubbles to collect at the crawler surfaces, and upwardly migrate along the crawlers, and through the isolation zones to coalesce at the solution surface. Spanning the bottom of the micro chambers is an effluent plate 364 formed with an outlet aperture to pass effluent fluid.

Like the foregoing embodiments, the upper portions of the respective channels define the respective separation chambers 330, 336, and 342. The separation chambers provide a convenient area for collecting and draining, or de-watering, the coalesced froth or floc and may comprise a single collection chamber.

Further referring to FIGS. 19 and 22, the three passes 320, 322, and 324 are coupled together in series to effect a multi-stage system to process the solution through a corresponding number of process cycles. To effect the cascading construction, respective first and second pickups 362 and 364 (FIG. 22) are positioned in the respective first and second micro chambers 328 and 334 and plumbed to the respective second and third hydrocyclones 308 and 310. The pickups are driven by pump units (not shown) to extract treated solution from the first micro chamber 326 into the second hydrocyclone 308 for further processing, and solution from the second micro chamber 332 into the third hydrocyclone 310 for final processing.

During operation, the flotation tank 312 is initially filled with relatively clean water such that the water level is higher than the respective channel separation walls 358, and 360. The system then directs solution from the solution source (not shown) through the first hydrocyclone 306 and into the first channel 320 for a first processing pass. As the bubble-rich solution flows along the path, the respective secondary vanes 350 create respective isolated areas of high dynamic pressure that cooperate with the controlled eddy currents to draw relatively large and more buoyant bubbles out of the stream and into the respective flotation cells. Once resident in a flotation cell, the relatively large and more buoyant bubbles may proceed upwardly to the surface of the tank in a relatively turbulent-free environment for subsequent collection by the first separation chamber 330.

The clarified solution in the first micro chamber 326 is then re-circulated through the first pick-up 362 and pumped into the inlet of the second hydrocyclone 308. The flow through the first pick-up is conveniently higher than the solution flow introduced into the first channel 320 such that clarified water from the second and third channels 322 and 324 leak over into the first channel. This provides an efficient liquid seal to minimize leakage of contaminated water into the further processed solutions residing in the second and third channels.

The pre-treated solution undergoes a second pass through the second hydrocyclone 308 and through the second channel 322 in much the same way as described above for the first pass. For bubbles that lacked the buoyancy necessary to separate from the solution flow into one of the flotation cells during the first or second passes, the second micro chamber 334 offers a subsequent opportunity for migration to the solution surface.

As noted above, the cross-sectional configuration of each micro chamber causes a reduced velocity of the fluid flow, thereby minimizing turbulence in the micro chamber. As a result, fine micro bubbles are given the opportunity to slowly drift upwardly to the first crawler 354, where they coalesce to form larger bubbles. The larger bubbles then migrate upwardly along the crawler surface until reaching the entrance to the first isolation zone. The zone is conveniently walled off from the flowing solution to provide a "safe harbor" for the micro bubbles to escape to the surface of the solution.

The further clarified solution in the second micro chamber 334 is directed by the second pickup 364 to the third hydrocyclone 310 for final processing along a third pass. The third pass may include a similar or different mode of treating within the hydrocyclone, or involve a different form of stimulation to further separate additional contaminants from the solution. The solution progresses along the third pass in much the same way as the first and second passes. After reaching the third micro chamber 340, the liquid exits as effluent through the effluent plate 364.

Those skilled in the art will appreciate the many benefits and advantages afforded by the present invention. Of particular significance is the capability of operating at relatively high throughput rates without a dependence on bubble residence time. This enables flotation tank constructions of substantially smaller size than previously known which translates to significant cost reductions. Additionally, by minimizing the effect of bubble residence time on system performance, operational characteristics may be substantially improved.

Further, improved throughput with a substantially reduced footprint is also achieved through the unique combination and construction of modular components. Having the flexibility to implement a plurality of stages widens the range of applications for the present invention, for example, to industrial laundries, mechanical equipment washdown, food and vegetable processors, poultry and meat slaughter, and other industrial wastewater uses.

Another significant advantage afforded by the present invention is the maintenance of ribbon uniformity inside the air sparged hydrocyclone during operation. This advantage is realized by the omission of any impediments at the hydrocyclone outlet, such as a froth pedestal. Further, given the extremely high surface area due to the vast numbers of bubbles, gas transfer rates are enhanced consistent with Henry's Law.

While the invention has been particularly shown and described with reference to the preferred embodiments thereof, it will be understood by those skilled in the art that various changes in form and detail may be made therein without departing from the spirit and scope of the invention.

What is claimed is:

1. A fluid conditioning system for coupling to a first solution source, said fluid conditioning system including:
a containment vessel defining a treatment environment, said containment vessel including a wall defining a fluid passage and a having an input apparatus, said input apparatus coupled to said solution source for receiving a first solution stream and directing said solution stream through said passage helically along said cylindrical wall, said containment vessel including a sparging apparatus disposed downstream of said inlet for sparging a gas into said solution stream to create bubble froth, and an outlet for discharging said sparged solution stream;
said outlet including a centrally located froth collection apparatus for collecting said bubble froth and a skimmer apparatus for directing froth from an inner surface of said helically flowing solution toward said centrally located froth collection apparatus; and
a flotation tank disposed proximate said hydrocyclone for receiving said discharged solution stream, said flotation tank adapted to carry a second solution to effect flotation of said gas to the surface of said second solution and having a tank outlet for exiting processed effluent from said tank.

2. A fluid conditioning system according to claim 1 wherein said containment vessel includes:
a cylindrical housing; and
a tubular fluid passage disposed concentrically within said housing.

3. A fluid conditioning system according to claim 1 wherein:
said containment vessel comprises an air sparged hydrocyclone having a porous tubular fluid passage.

4. A fluid conditioning system according to claim 1 wherein said input apparatus comprises:
an input port for accepting solution to be processed;
an input chamber for receiving said solution and supplying said solution into said passage as said helically flowing solution; and
a fixed restrictor for forming ribbons of said solution proximate to the periphery of said input chamber.

5. A fluid conditioning system according to claim 1 wherein said input apparatus comprises:
an input port for accepting solution to be processed;
an input chamber for receiving said solution and supplying said solution into said passage as said helically flowing solution; and
at least one adjustably positionable restrictor for forming ribbons of said input solution proximate to the periphery of said input chamber, said restrictor operable to adjust the flow of said helically flowing solution within said inner chamber.

6. A fluid conditioning system according to claim 5 wherein:
said input chamber includes a ribbon control apparatus for feeding said solution into said passage.

7. A fluid conditioning system according to claim 1 wherein said sparging apparatus includes:
a gas source; and
a porous tube disposed concentric with said containment vessel and coupled to said gas source to deliver gas into said helically flowing solution.

8. A fluid conditioning system according to claim 1 wherein said skimmer apparatus includes:
a gas plenum located proximate said containment vessel distal end;
an gas input formed on said plenum for providing pressurized gas; and
said gas plenum includes an open end defining a skimmer outlet port for directing gas from said plenum toward an inner position of said helically flowing solution.

9. A fluid conditioning system according to claim 8 wherein said skimming apparatus further includes:
a restrictor for constraining the radius of said helically flowing solution to position said inner surface of said solution in line with said gas directed from said skimmer outlet port.

10. A fluid conditioning system according to claim 1 wherein said flotation tank includes:
a surface skimmer for gathering froth at said second solution surface.

11. A fluid conditioning system for coupling to a first solution source, said fluid conditioning system including:
a containment vessel defining a treatment environment, said containment vessel including a wall defining a fluid passage and a having an inlet apparatus, said inlet apparatus coupled to said solution source for receiving a first solution stream and directing said solution stream through said passage helically along said cylindrical wall, said containment vessel including a sparging apparatus disposed downstream of said inlet for sparging a gas into said solution stream to create bubble froth, and an outlet for discharging said sparged solution stream said outlet including a peripherally located solution collection apparatus for collecting and discharging said helically flowing solution; and
a flotation tank disposed proximate said hydrocyclone for receiving said discharged solution stream, said flotation tank adapted to carry a second solution to effect flotation of said gas to the surface of said second solution and having a tank outlet for exiting processed effluent from said tank.

12. A fluid conditioning system according to claim 11 wherein said peripherally located solution collection apparatus comprises:
a tube having respective inner and outer ends, said inner end coupled to said containment vessel;
a trough coupled to said tube outer end collect said helically flowing solution; and
said trough includes a formed radial gap positioned to collect said splayed helically flowing solution and direct said solution to said outlet.

13. A fluid conditioning system for coupling to a first solution source, said fluid conditioning system including:
a containment vessel defining a treatment environment, said containment vessel including a wall defining a fluid passage and a having an inlet apparatus, said inlet apparatus coupled to said solution source for receiving a first solution stream and directing said solution stream through said passage helically along said cylindrical wall, said containment vessel including a sparging apparatus disposed downstream of said inlet for sparging a gas into said solution stream to create bubble froth, and an outlet for discharging said sparged solution stream; and
a flotation tank disposed proximate said hydrocyclone for receiving said discharged solution stream, said flotation tank adapted to carry a second solution to effect flotation of said gas to the surface of said second solution and having a tank outlet for exiting processed effluent from said tank, said flotation tank including a downwardly sloping baffle for directing said received discharged solution stream.

14. A fluid conditioning system for coupling to a first solution source, said fluid conditioning system including:

a containment vessel defining a treatment environment, said containment vessel including a wall defining a fluid passage and a having an inlet apparatus, said inlet apparatus coupled to said solution source for receiving a first solution stream and directing said solution stream through said passage helically along said cylindrical wall, said containment vessel including a sparging apparatus disposed downstream of said inlet for sparging a gas into said solution stream to create bubble froth, and an outlet for discharging said sparged solution stream; and a flotation tank disposed proximate said hydrocyclone for receiving said discharged solution stream, said flotation tank adapted to carry a second solution to effect flotation of said gas to the surface of said second solution and having a tank outlet for exiting processed effluent from said tank, said flotation tank including:

a flotation chamber;

an influent chamber disposed proximate said flotation chamber for receiving a solution stream into said tank and directing said stream along a downwardly sloping fluid path;

an isolation unit disposed between said influent chamber and said flotation chamber and including a plurality of spaced-apart vanes defining respective flotation cells, said vanes having respective bottom edges disposed proximate said fluid path for accelerating said solution stream along said path and extracting bubbles from said stream into said flotation chamber; and an effluent chamber for collecting and exiting said bubble-extracted solution from said tank.

15. A fluid conditioning system according to claim 14 wherein:

said respective edges are disposed angularly to isolate solution turbulence within said influent chamber while simultaneously drawing bubbles into said flotation chamber.

16. A fluid conditioning system according to claim 15 wherein:

said edges are configured to create a high dynamic pressure zone above said fluid path.

17. A fluid conditioning system according to claim 14 wherein said flotation tank further includes:

a recirculation mechanism for dynamically controlling the velocity of said stream along said path.

18. A fluid conditioning system according to claim 17 wherein:

said recirculation mechanism includes an outlet connected to said flotation chamber;

a pump for drawing partially treated solution through said outlet; and a recirculating solution supply disposed downstream of said pump for delivering said recirculated solution back to said influent chamber.

19. A fluid conditioning system according to claim 18 wherein:

said recirculating solution supply comprises an air sparged hydrocyclone.

20. A fluid conditioning system according to claim 14 wherein:

said influent chamber includes a baffle formed with a downwardly sloping surface, and having an upper edge disposed at the top of said tank and a bottom edge fixed in parallel relationship to the bottom of said tank.

21. A fluid conditioning system according to claim 20 wherein:

said baffle surface is configured to redirect said stream from a substantially vertical flow to a substantially horizontal laminar flow at said tank bottom.

22. A fluid conditioning system according to claim 21 wherein:

said vanes include a primary vane offset laterally from said baffle surface and having an upper edge projecting upwardly above the surface of said tank to minimize turbulence along said tank surface.

23. A fluid conditioning system according to claim 22 wherein:

aid vanes includes e a plurality of secondary vanes spaced from said primary vane in a predetermined relationship.

24. A fluid conditioning system according to claim 14 wherein:

said effluent chamber includes a cantilevered partition to inhibit the exit of bubble-retaining solution.

* * * * *